United States Patent
Halter et al.

(10) Patent No.: US 9,902,101 B2
(45) Date of Patent: Feb. 27, 2018

(54) SCREW-MOVING ASSEMBLY INCLUDING SCREW-MOVING ACTUATOR AND BIAS-ADJUSTMENT MECHANISM

(71) Applicant: Husky Injection Molding Systems Ltd., Bolton (CA)

(72) Inventors: Christophe Halter, Selange (BE); Claude Ferdinand Hostert, Hassel (LU); Douglas James Weatherall, Bolton (CA)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 672 days.

(21) Appl. No.: 14/370,822

(22) PCT Filed: Nov. 28, 2012

(86) PCT No.: PCT/CA2012/050856
§ 371 (c)(1),
(2) Date: Jul. 7, 2014

(87) PCT Pub. No.: WO2013/110167
PCT Pub. Date: Aug. 1, 2013

(65) Prior Publication Data
US 2015/0290855 A1      Oct. 15, 2015

Related U.S. Application Data

(60) Provisional application No. 61/590,942, filed on Jan. 26, 2012.

(51) Int. Cl.
*B29C 45/50* (2006.01)
*B01F 15/06* (2006.01)
(Continued)

(52) U.S. Cl.
CPC ...... *B29C 45/5008* (2013.01); *B01F 7/00416* (2013.01); *B01F 15/00538* (2013.01);
(Continued)

(58) Field of Classification Search
CPC .................. B01F 15/06; B01F 15/0247; B01F 15/00538; B01F 2015/062; B01F 7/00416; B29C 2045/5044
See application file for complete search history.

(56) References Cited

U.S. PATENT DOCUMENTS 2,680,883 A * 6/1954 Ashbaugh ............... B29C 45/70
                                                           425/166
3,436,443 A * 4/1969 Hutchinson ............. B29C 45/50
                                                           264/328.19
(Continued)

FOREIGN PATENT DOCUMENTS

EP    0760277 A1    3/1997
FR    2216095 A1    8/1974
(Continued)

OTHER PUBLICATIONS

European Search Report, Gemeinböck, Gerald, dated Nov. 26, 2015, 7 pages.

*Primary Examiner* — Yogendra N Gupta
*Assistant Examiner* — Emmanuel S Luk

(57) ABSTRACT

A screw-moving assembly (100) for a screw assembly (903), the screw-moving assembly (100) comprising: a screw-moving actuator (102); and a bias-adjustment mechanism (104); wherein the screw-moving actuator (102) and the bias-adjustment mechanism (104) are configured to connect to the screw assembly (903); the screw-moving actuator (102) is configured to transmit, in use, a screw-translation force (112) to a longitudinal central axis (905) of the screw assembly (903); and the bias-adjustment mechanism (104) is
(Continued)

configured to transmit, in use, a biasing force (114) to the longitudinal central axis (905) of the screw assembly (903).

12 Claims, 15 Drawing Sheets

(51) Int. Cl.
*B01F 15/02* (2006.01)
*B01F 7/00* (2006.01)
*B01F 15/00* (2006.01)

(52) U.S. Cl.
CPC .......... *B01F 15/0247* (2013.01); *B01F 15/06* (2013.01); *B01F 2015/062* (2013.01); *B29C 2045/5044* (2013.01); *B29C 2045/5068* (2013.01)

(56) References Cited

U.S. PATENT DOCUMENTS

| | | | | |
|---|---|---|---|---|
| 3,509,600 | A * | 5/1970 | Noble | B29C 45/82 425/145 |
| 3,894,824 | A * | 7/1975 | Wells | B29C 45/82 425/146 |
| 4,019,845 | A * | 4/1977 | Birkhofer | B29C 45/82 222/334 |
| 4,207,047 | A * | 6/1980 | Kolb | B29C 47/54 425/146 |
| 4,579,515 | A * | 4/1986 | Kawaguchi | B29C 45/5008 425/136 |
| 4,615,669 | A * | 10/1986 | Fujita | B29C 45/70 425/147 |
| 4,712,991 | A * | 12/1987 | Hehl | B29C 45/1777 264/40.3 |
| 4,747,576 | A * | 5/1988 | Saito | F16K 1/523 251/25 |
| 5,217,725 | A * | 6/1993 | Inaba | B29C 45/5008 264/40.4 |
| 5,232,714 | A * | 8/1993 | Kohno | B29C 45/76 264/40.4 |
| 5,665,282 | A * | 9/1997 | Nakamura | B29C 45/5008 264/328.1 |
| 5,688,535 | A * | 11/1997 | Koda | B29C 45/5008 264/40.7 |
| 5,714,176 | A * | 2/1998 | Wurl | B29C 45/5008 366/100 |
| 5,747,076 | A * | 5/1998 | Jaroschek | B29C 45/5008 264/40.3 |
| 5,911,924 | A * | 6/1999 | Siegrist | B29C 45/5008 264/328.1 |
| 5,935,494 | A * | 8/1999 | Wurl | B29C 45/5008 264/328.1 |
| 6,183,682 | B1 * | 2/2001 | Shimizu | B29C 45/5008 264/328.1 |
| 6,341,953 | B1 * | 1/2002 | Okubo | B29C 45/82 264/40.7 |
| 6,379,119 | B1 * | 4/2002 | Truninger | B29C 45/82 264/40.1 |
| 6,477,835 | B1 | 11/2002 | Geiger | |
| 6,478,572 | B1 * | 11/2002 | Schad | B29C 45/5008 425/145 |
| 6,557,344 | B1 * | 5/2003 | Puschel | B29C 45/82 60/422 |
| 7,686,607 | B2 * | 3/2010 | Dantlgraber | B29C 45/67 425/542 |
| 7,896,637 | B2 * | 3/2011 | Yamaura | B29C 45/82 264/211.21 |
| 2003/0029325 | A1 * | 2/2003 | Dantlgraber | B22D 17/26 99/353 |
| 2003/0042640 | A1 * | 3/2003 | Kubota | B29C 45/82 264/40.1 |
| 2004/0012122 | A1 * | 1/2004 | Nagaoka | B29C 45/561 264/328.7 |
| 2004/0013764 | A1 * | 1/2004 | Dantlgraber | B29C 45/07 425/574 |
| 2004/0065974 | A1 * | 4/2004 | Dantlgraber | B29C 45/5008 264/40.5 |
| 2004/0081717 | A1 * | 4/2004 | Marazita | B29C 45/7653 425/150 |
| 2004/0109917 | A1 * | 6/2004 | Schad | B29C 45/5008 425/574 |
| 2004/0213871 | A1 | 10/2004 | Wohlrab et al. | |
| 2007/0020354 | A1 * | 1/2007 | Dantlgraber | B29C 45/5008 425/574 |
| 2007/0297273 | A1 * | 12/2007 | Urbanek | B29C 45/5008 366/78 |
| 2008/0026095 | A1 * | 1/2008 | Wessely | B29C 45/5008 425/556 |
| 2008/0199556 | A1 | 8/2008 | Dantlgraber | |
| 2008/0268091 | A1 * | 10/2008 | Dantlgraber | B29C 45/14639 425/587 |
| 2009/0057938 | A1 * | 3/2009 | Zhang | B29C 45/7646 264/40.1 |
| 2009/0297650 | A1 * | 12/2009 | Shimizu | B29C 45/82 425/145 |
| 2010/0283186 | A1 * | 11/2010 | Notz | B29C 45/5008 264/328.1 |
| 2011/0247777 | A1 * | 10/2011 | Hauser | B22D 17/32 164/303 |
| 2012/0093968 | A1 * | 4/2012 | Yuan | F15B 1/024 425/542 |
| 2012/0248654 | A1 * | 10/2012 | Van Eerde | B29C 45/5008 264/328.19 |
| 2012/0251650 | A1 * | 10/2012 | Mucibabic | B29C 45/82 425/166 |

FOREIGN PATENT DOCUMENTS

WO 2011116477 A1 9/2011
WO 2011141423 A1 11/2011

* cited by examiner

US 9,902,101 B2

SCREW-MOVING ASSEMBLY INCLUDING SCREW-MOVING ACTUATOR AND BIAS-ADJUSTMENT MECHANISM

TECHNICAL FIELD

Aspects generally relate to (and not limited to) a screw-moving assembly including (and not limited to) a screw-moving assembly having a molding system.

BACKGROUND

United States Patent Publication Number 2008/199556 discloses a drive unit, in particular for an injection unit or an ejector of an injection molding machine.

WO 2011/141423 discloses a hybrid drive having an electric motor coupled to a hydraulic drive having a double-acting hydraulic piston and a piston rod.

SUMMARY

The inventors have researched a problem associated with known molding systems that inadvertently manufacture bad-quality molded articles or parts. After much study, the inventors believe they have arrived at an understanding of the problem and its solution, which are stated below.

All-electric injection units (molding systems) have no hydraulic circuits, and they require a relatively higher instantaneous power, which requires a relatively higher installed power supply. The higher installed power supply has another drawback of requiring hardware having high inertias, limiting dynamic operation of the injection unit, which is a penalty for manufacturing molded articles for the packaging and closure markets. Also, using a relatively larger electric drives makes the all-electric injection unit relatively more expensive to manufacture.

In order to resolve, at least in part, the above-noted issues, according to a first aspect, there is provided a screw-moving assembly (100) for a screw assembly (903), the screw-moving assembly (100) comprising: a screw-moving actuator (102); and a bias-adjustment mechanism (104); wherein the screw-moving actuator (102) and the bias-adjustment mechanism (104) are configured to connect to the screw assembly (903); the screw-moving actuator (102) is configured to transmit, in use, a screw-translation force (112) to a central axis (905) of the screw assembly (903); and the bias-adjustment mechanism (104) is configured to transmit, in use, a biasing force (114) to the central axis (905) of the screw assembly (903).

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description of the non-limiting embodiments when taken in conjunction with the accompanying drawings, in which.

Figure 1:
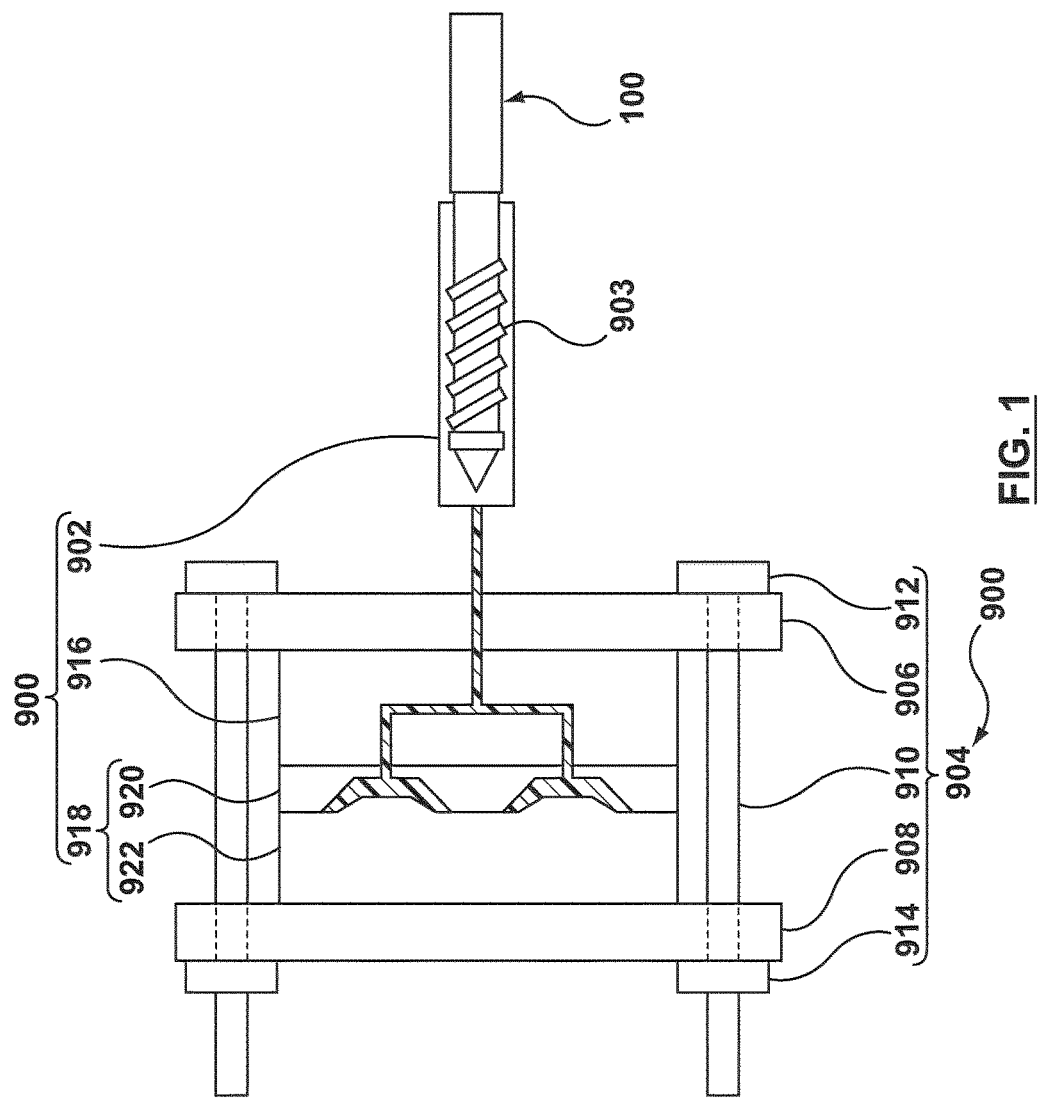
FIG. 1 depicts examples of the screw-moving assembly (100), a molding system (900), an extruder assembly (902), and a screw assembly (903)
Figure 2:
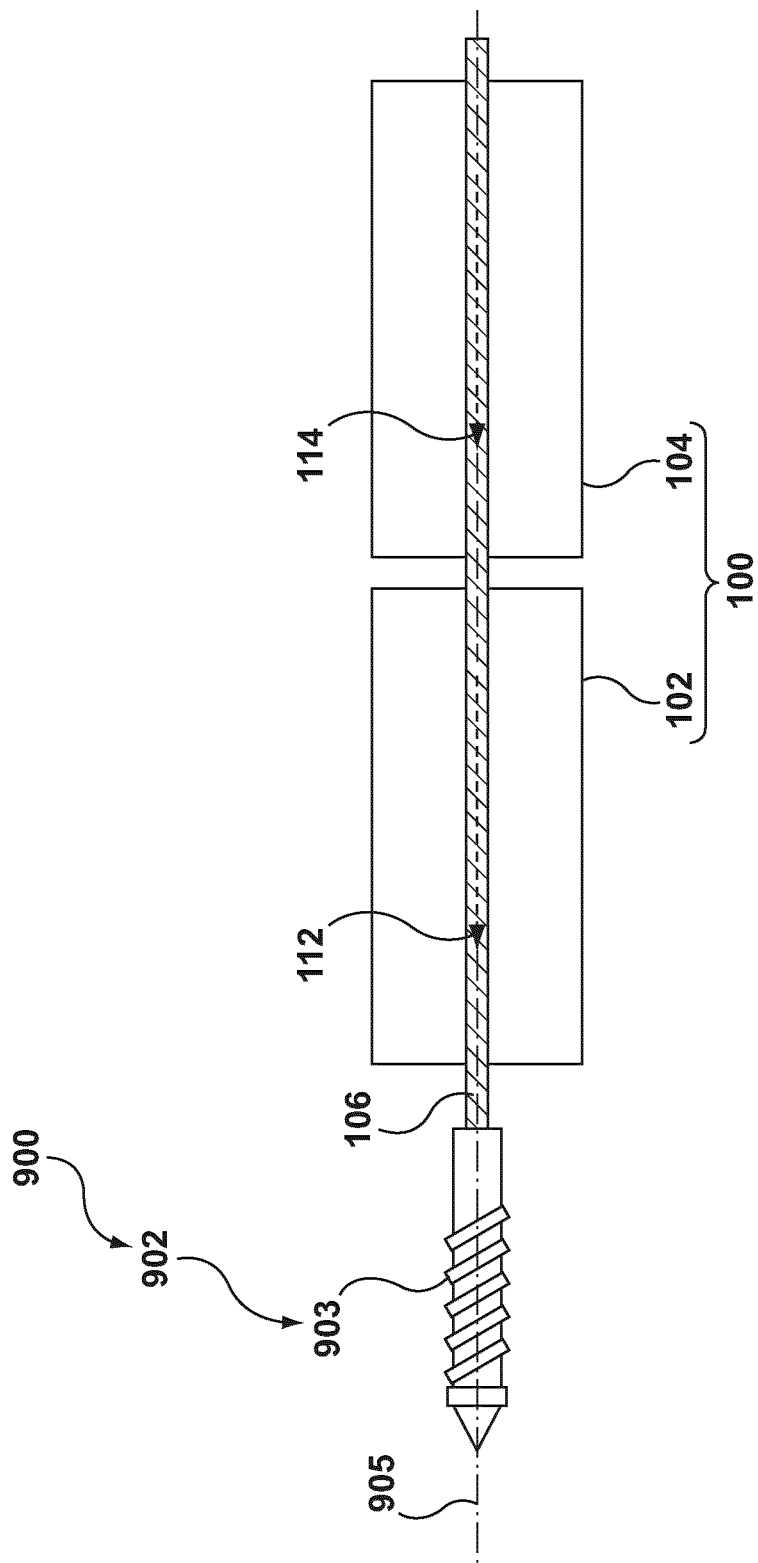
FIG. 2 depicts another schematic representation of an example of the screw-moving assembly (100) of FIG. 1.
Figure 5A:
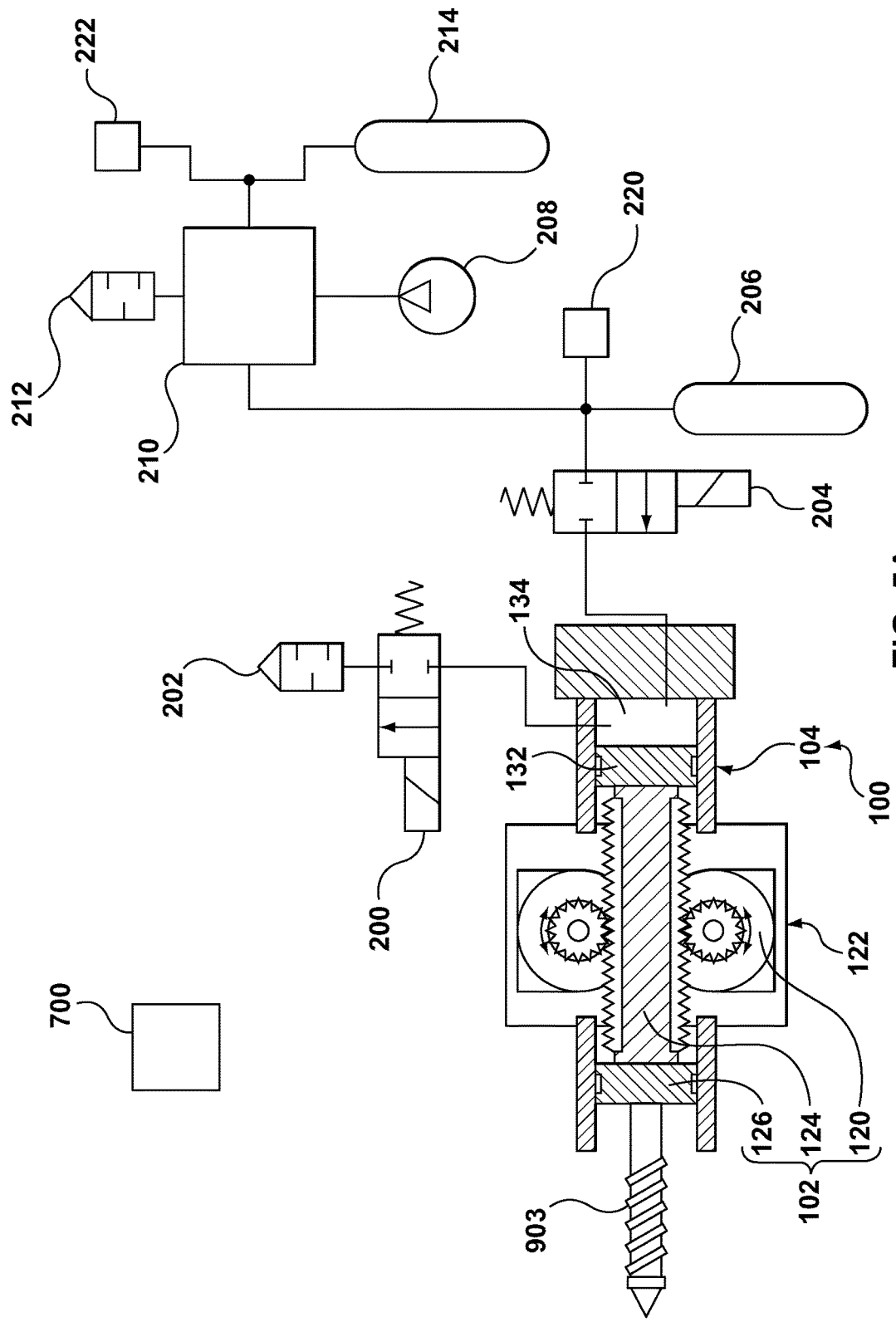
FIGS. 5A and 5B depict schematic representations of a first example of the bias-adjustment mechanism (104) of the screw-moving assembly (100) of FIG. 1.
Figure 6A:
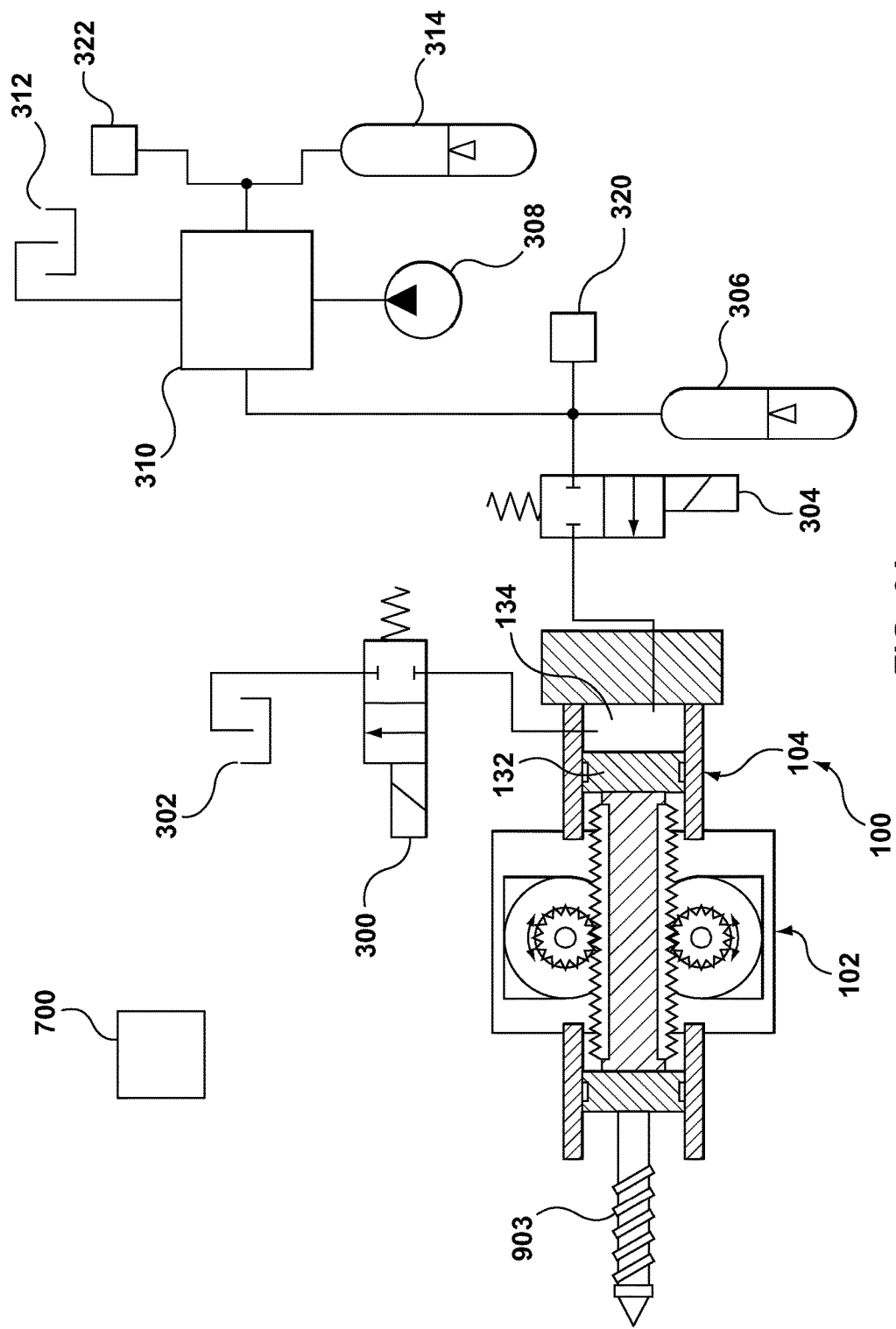
Figure 6B:
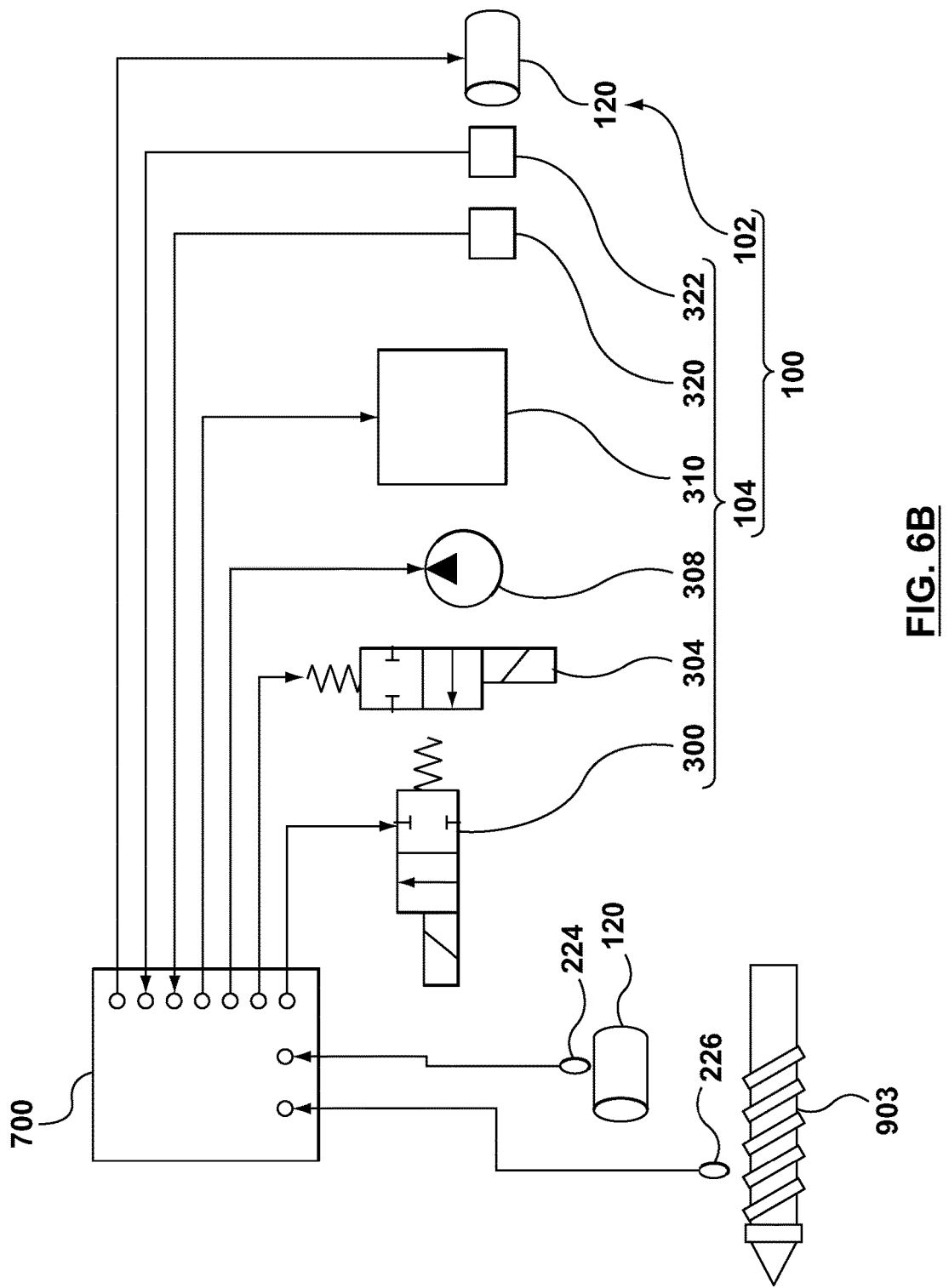
Figure 7:
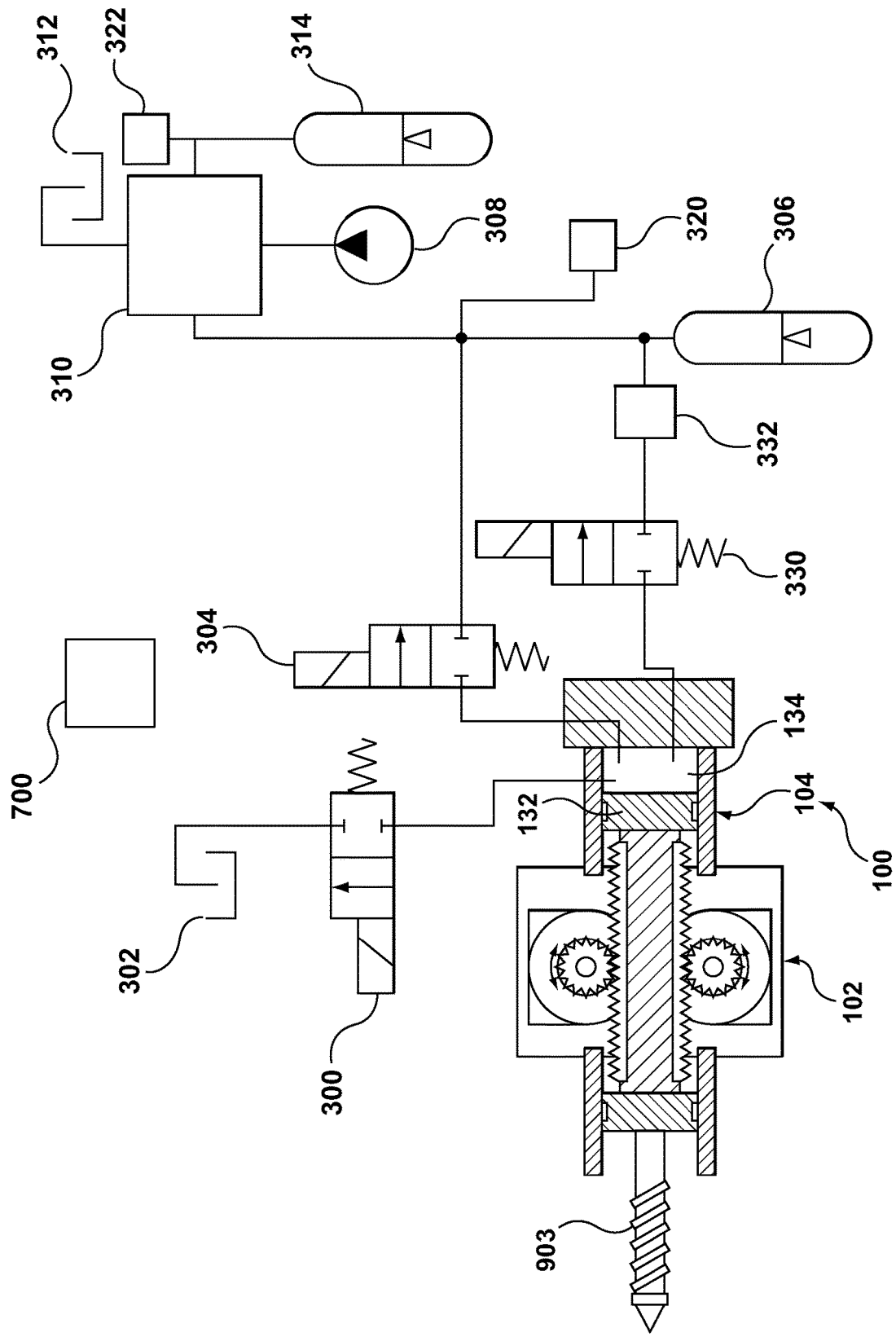
Figure 8:
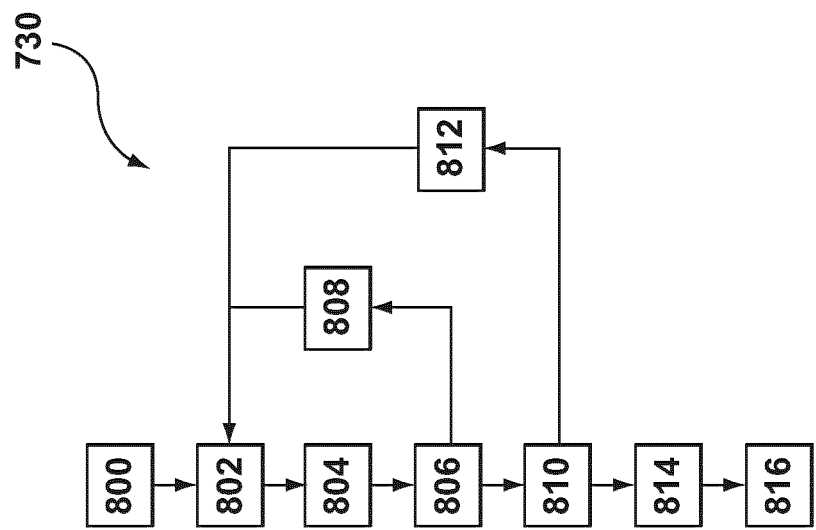
Figure 9:
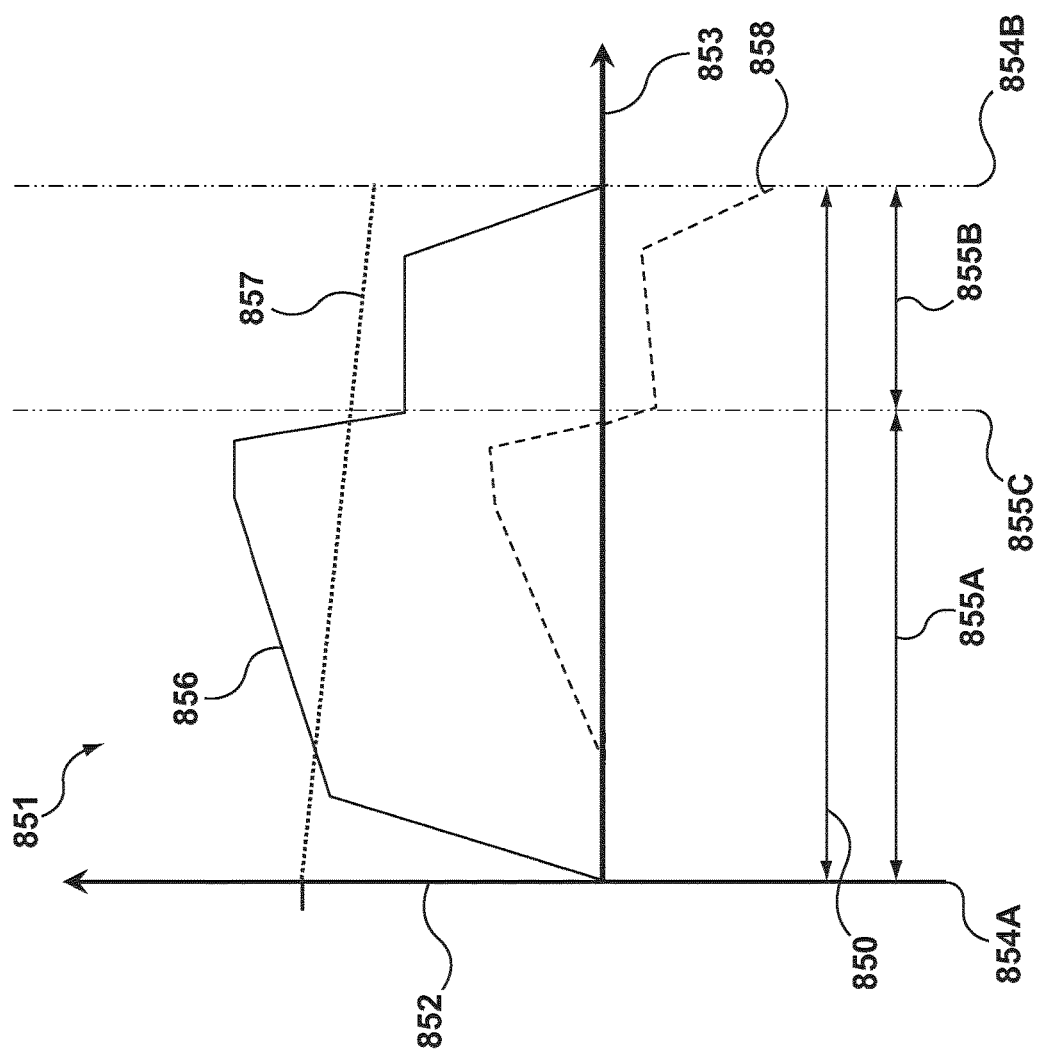

FIG. 5 B depicts the connections between the controller assembly (700) and the various components of the bias-adjustment mechanism (104) of FIG. 5A;

FIGS. 6A and 6B depict schematic representations of a second example of the bias-adjustment mechanism (104) of the screw-moving assembly (100) of FIG. 1;

FIG. 6B depicts the connections between the controller assembly (700) and the various components of the bias-adjustment mechanism (104) of FIG. 6A;

FIG. 7 depicts a schematic representation of a variation of the second example of the bias-adjustment mechanism (104) of FIG. 6A;

FIG. 8 depicts various operations to be executed by the controller assembly (700) of FIG. 6B;

FIG. 9 depicts a profile of various forces associated with the bias-adjustment mechanism (104) of FIG. 2.

Figure 10:
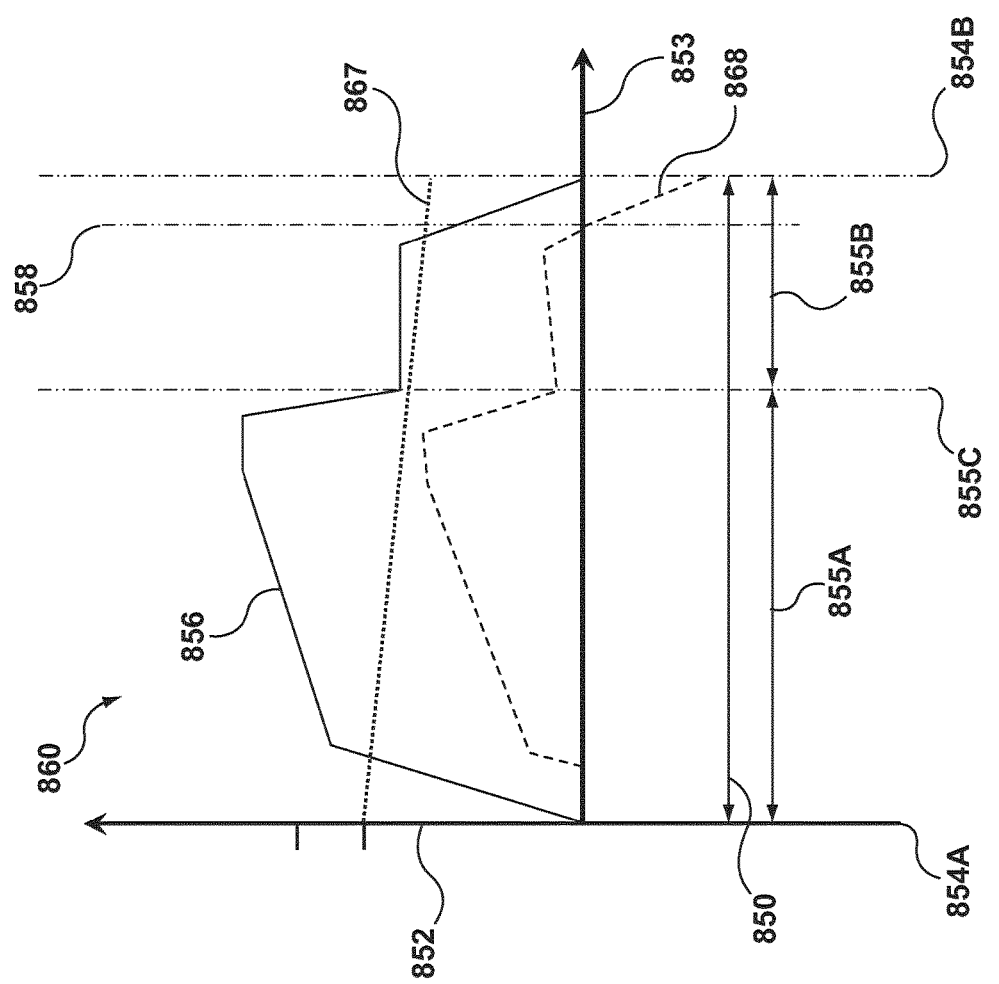
Figure 11:
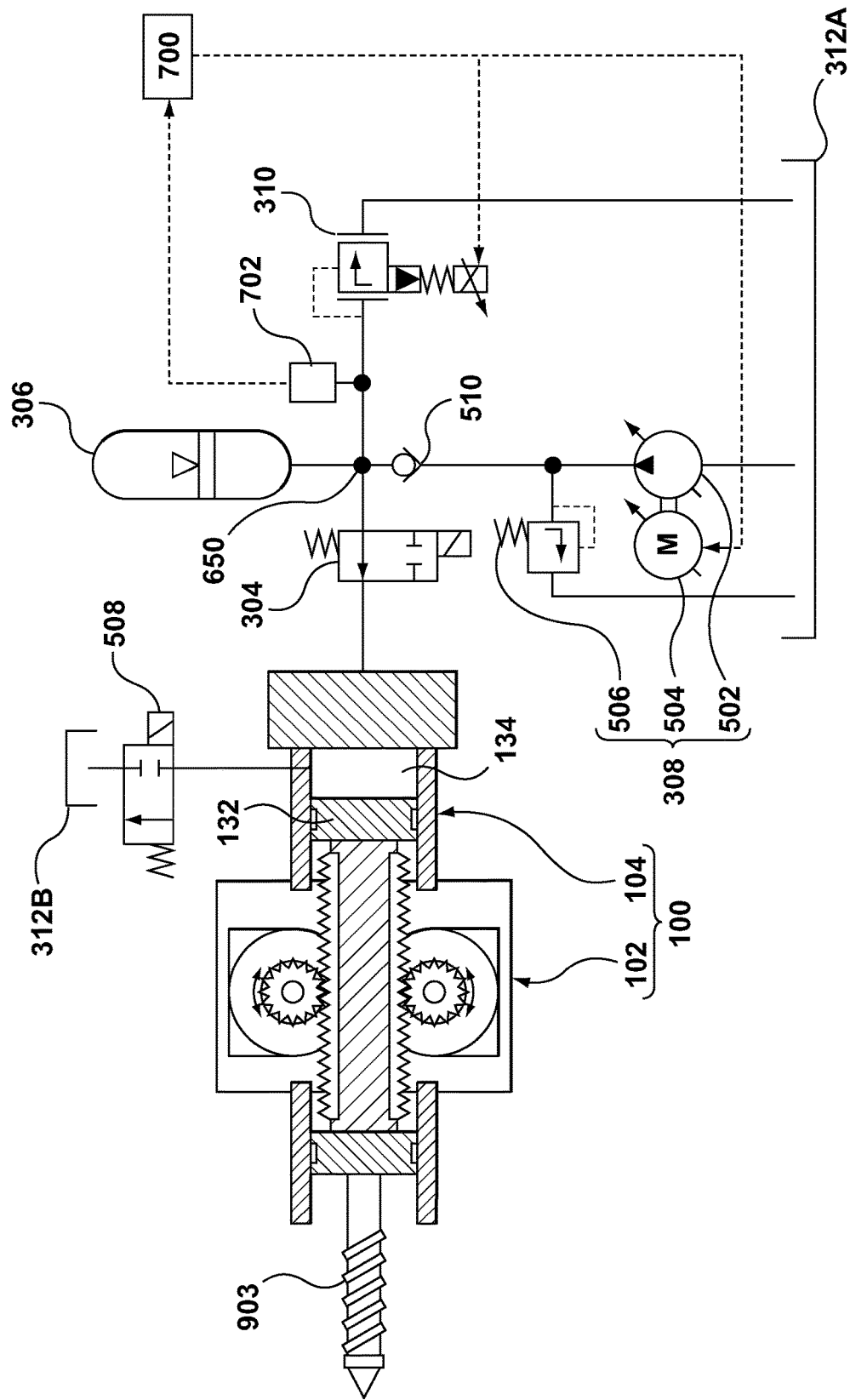
Figure 12:
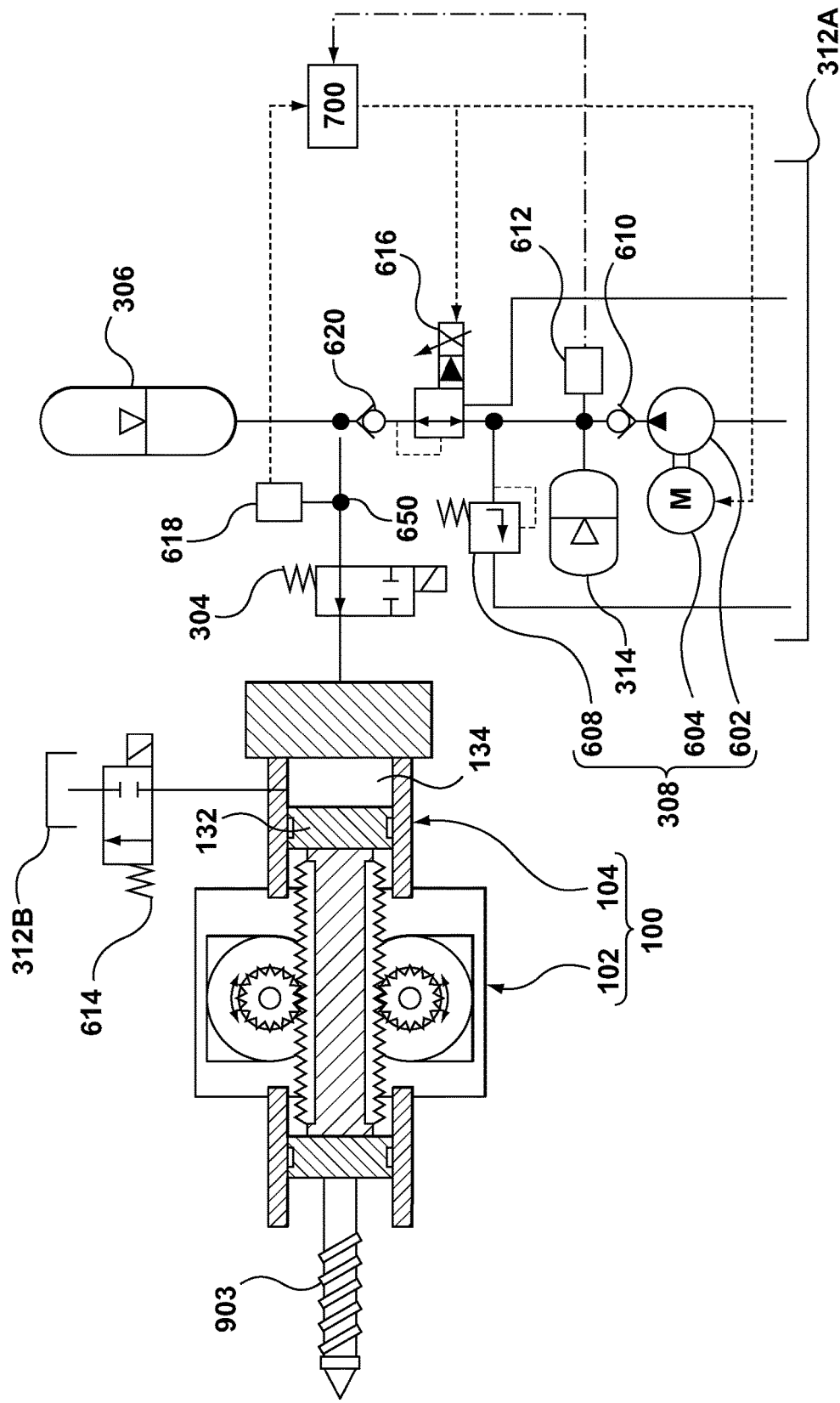
Figure 13:
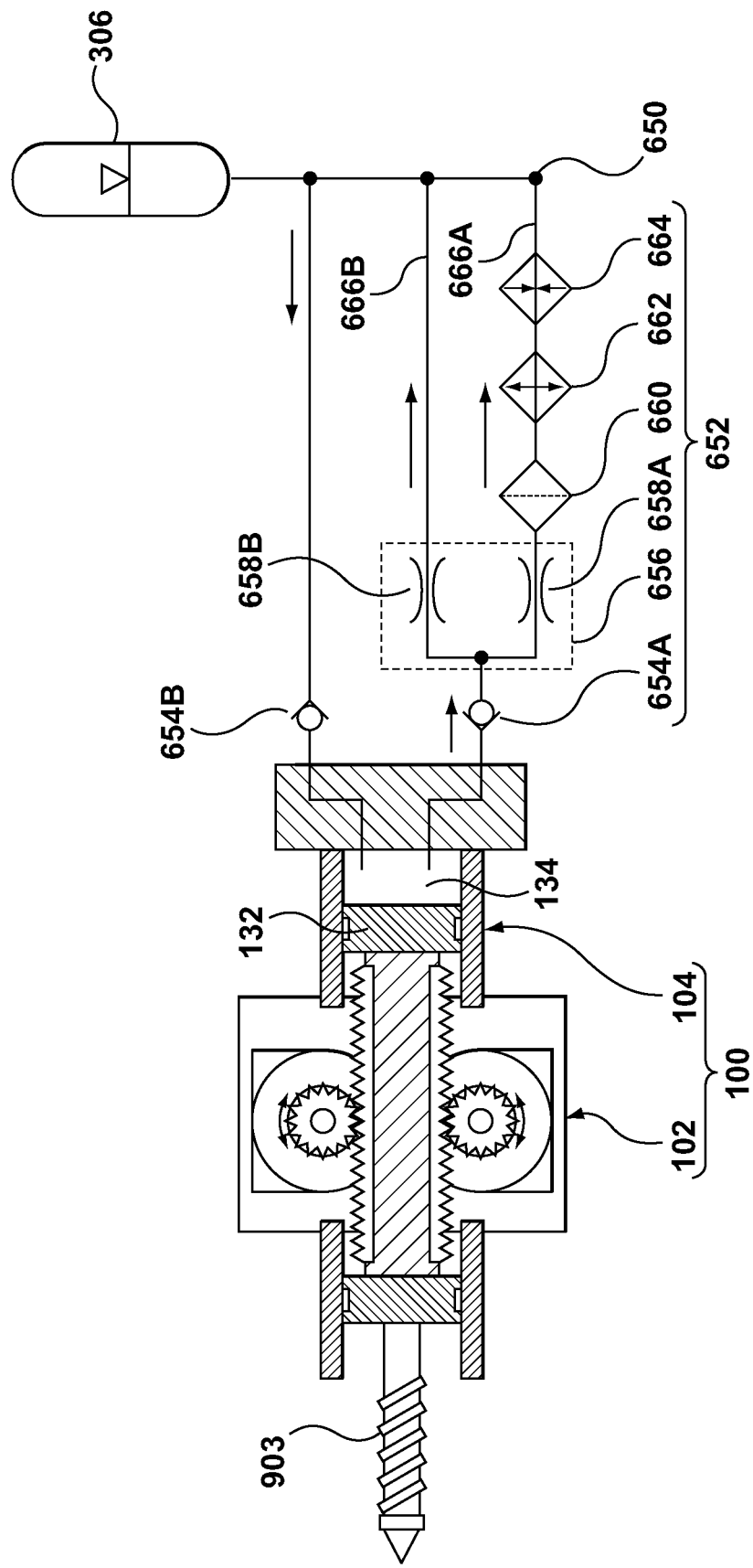

FIG. 10 depicts a profile of the forces associated with the bias-adjustment mechanism (104) of FIG. 2;

FIG. 11 depicts a schematic representation of an example of the screw-moving assembly (100) having an example of the fluid-supply assembly (308) of the bias-adjustment mechanism (104) depicted in FIG. 6 and FIG. 7;

FIG. 12 depicts a schematic representation of another example of the fluid-supply assembly (308) of the bias-adjustment mechanism (104) depicted in FIG. 6 and FIG. 7; and FIG. 13 depicts a schematic representation of an example of the bias-adjustment mechanism (104) of FIG. 2.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

With reference to FIG. 1, there are depicted examples of the screw-moving assembly (100), a molding system (900), an extruder assembly (902), and a screw assembly (903) It will be appreciated that the screw-moving assembly (100), the molding system (900), the extruder assembly (902), and the screw assembly (903) may include components that are known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21 669-2), (ii) "*Injection Molding Handbook*" authored by ROSATO AND ROSATO (ISBN: 0-412-99381-3), (iii) "*Iniection Molding Systems* "3rd Edition authored by JOHANNABER (ISBN 3-446-17733-7) and/or (iv) "*Runner and Gatiria Design Handbook*" authored by BEAUMONT (ISBN 1-446-22672-9). It will be appreciated that for the purposes. of this document, the phrase "includes (but is not limited to)" is equivalent to the word "comprising." The word "comprising" is a transitional phrase or word that links the preamble of a patent claim to the specific elements set forth in the claim that define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim.

On the one hand, the screw-moving assembly (100), the molding system (900), the extruder assembly (902), and the screw assembly (903) may all be sold separately. That is, the screw-moving assembly (100) may be sold as a retrofit item (assembly) that may be installed to an existing molding system, existing extruder assembly, or an existing screw assembly. Therefore, in accordance with an option, it will be appreciated that the screw-moving assembly (100) may further include (and is not limited to): the extruder assembly (902) having the screw assembly (903) connected to the screw-moving assembly (100). As well, in accordance with another option, it will be appreciated that the screw-moving assembly (100) may further include (and is not limited to): the molding system (900) having the extruder assembly (902) having the screw assembly (903) configured to connect to the screw-moving assembly (100). On the other hand, the screw-moving assembly (100), the molding system (900), the extruder assembly (902), and the screw assembly (903) may all be sold to an end user, as an integrated product by one supplier.

Referring now to FIG. 1, there is depicted a schematic representation of an example of a molding system (900) having a screw-moving assembly (100). It will be appreciated that the molding system (900) and the screw-moving assembly (100) may be sold separately, by separate vendors, to an end user, or a single vendor may supply the combination of the molding system (900) and the screw-moving assembly (100). The molding system (900) may be called, by way of example, an injection-molding system. According to the example depicted in FIG. 1, the molding system (900) includes (and is not limited to): (i) an extruder assembly (902), (ii) a clamp assembly (904), (iii) a runner system (916), and/or (iv) a mold assembly (918). The extruder assembly (902) is configured to receive (to house and accommodate) movement of a screw assembly (903) having a longitudinal central axis (905). The screw-moving assembly (100) is configured to couple to a screw assembly (903). Generally speaking, the screw-moving assembly (100) is configured to actuate movement (linear translation and/or rotational translation) of the screw assembly (903). The extruder assembly (902) is configured, to prepare, in use, a heated, flowable resin, and is also configured to inject or to move the resin from the extruder assembly (902) toward the runner system (916). Other names for the extruder assembly (902) may include injection unit, melt-preparation assembly, etc. By way of example, the clamp assembly (904) includes (and is not limited to): (i) a stationary platen (906), (ii) a movable platen (908), (iii) a rod assembly (910), (iv) a clamping assembly (912), and/or (v) a lock assembly (914). The stationary platen (906) does not move; that is, the stationary platen (906) may be fixedly positioned relative to the ground or floor. The movable platen (908) is configured to be movable relative to the stationary platen (906). A platen-moving mechanism (not depicted but known) is connected to the movable platen (908), and the platen-moving mechanism is configured to move, in use, the movable platen (908). The rod assembly (910) extends between the movable platen (908) and the stationary platen (906). The rod assembly (910) may have, by way of example, four rod structures positioned at the corners of the respective stationary platen (906) and the movable platen (908). The rod assembly (910) is configured to guide movement of the movable platen (908) relative to the stationary platen (906). A clamping assembly (912) is connected to the rod assembly (910). The stationary platen (906) is configured to support (or configured to position) the position of the clamping assembly (912). The lock assembly (914) is connected to the rod assembly (910), or may alternatively be connected to the movable platen (908). The lock assembly (914) is configured to selectively lock and unlock the rod assembly (910) relative to the movable platen (908). By way of example, the runner system (916) is attached to, or is supported by, the stationary platen (906). The runner system (916) is configured to receive the resin from the extruder assembly (902). By way of example, the mold assembly (918) includes (and is not limited to): (i) a mold-cavity assembly (920), and (ii) a mold-core assembly (922) that is movable relative to the mold-cavity assembly (920). The mold-core assembly (922) is attached to or supported by the movable platen (908). The mold-cavity assembly (920) is attached to or supported by the runner system (916), so that the mold-core assembly (922) faces the mold-cavity assembly (920). The runner system (916) is configured to distribute the resin from the extruder assembly (902) to the mold assembly (918).

In operation, the movable platen (908) is moved toward the stationary platen (906) so that the mold-cavity assembly (920) is closed against the mold-core assembly (922), so that the mold assembly (918) may define a mold cavity configured to receive the resin from the runner system (916). The lock assembly (914) is engaged so as to lock the position of the movable platen (908) so that the movable platen (908) no longer moves relative to the stationary platen (906). The clamping assembly (912) is then engaged to apply a camping pressure, in use, to the rod assembly (910), so that the clamping pressure then may be transferred to the mold assembly (918). The extruder assembly (902) pushes or injects, in use, the resin to the runner system (916), which then the runner system (916) distributes the resin to the mold cavity structure defined by the mold assembly (918). Once the resin in the mold assembly (918) is solidified, the clamping assembly (912) is deactivated so as to remove the clamping force from the mold assembly (918), and then the lock assembly (914) is deactivated to permit movement of the movable platen (908) away from the stationary platen (906), and then a molded article may be removed from the mold assembly (918).

FIG. 2 depicts another schematic representation of an example of the screw-moving assembly (100) of FIG. 1, in which the screw-moving assembly (100) is used for the screw assembly (903) of the extruder assembly (902) of the molding system (900) of FIG. 1. With reference to all of the FIGS (generally speaking), the screw-moving assembly (100) includes (and is not limited to) a combination of a screw-moving actuator (102) and a bias-adjustment mechanism (104). The screw-moving actuator (102) and the bias-adjustment mechanism (104) are configured to connect (either directly or indirectly) to the screw assembly (903). The screw-moving actuator (102) is configured to transmit, in use, a screw-translation force (112) to a longitudinal central axis (905) of the screw assembly (903). The bias-adjustment mechanism (104) is configured to transmit, in use, a biasing force (114) to the longitudinal central axis (905) of the screw assembly (903). It will be appreciated that the screw-translation force (112) and the biasing force (114)

as depicted in FIG. 2 as arrows may be pointed in the opposite direction as presently illustrated. The illustration of FIG. 2 merely provides a convenient example or representation of the direction of the forces: the forces may point to the left side of FIG. 2 or to right side of FIG. 2, depending on the operation of the screw-moving assembly (100).

Figure 3:
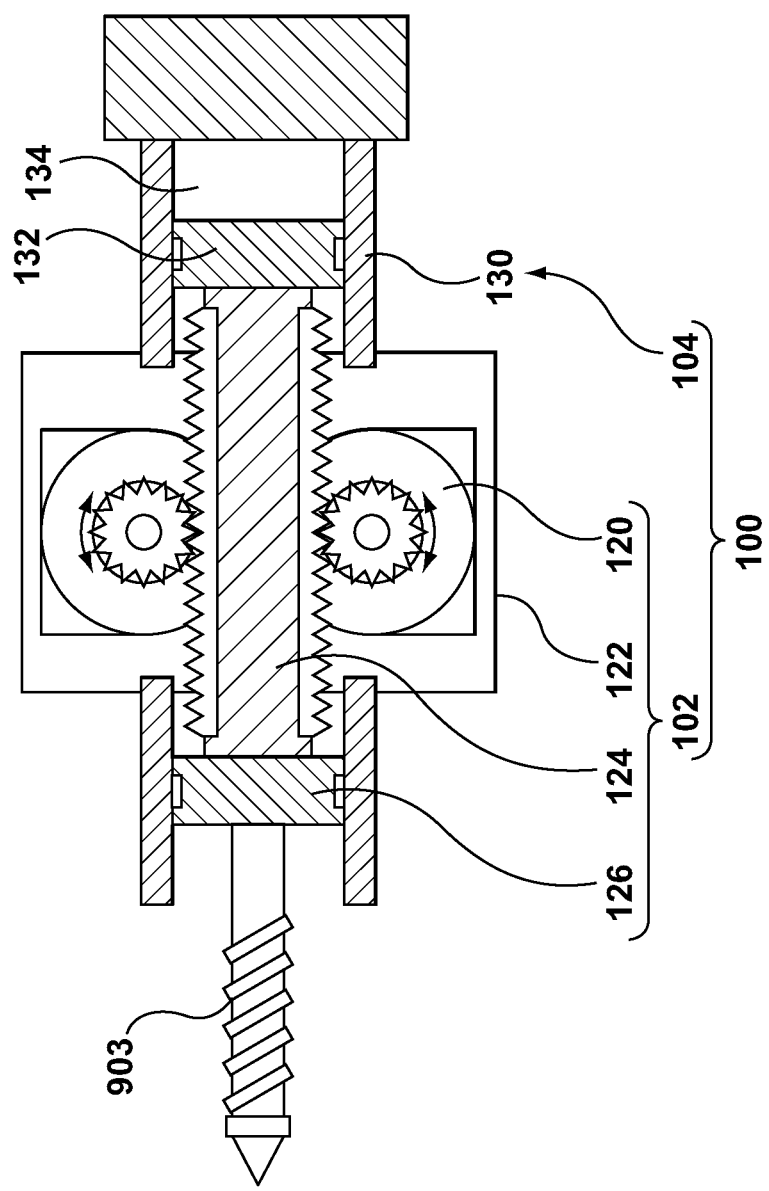
FIG. 3 depicts a schematic representation of an example of the screw-moving actuator (102) and of the bias-adjustment mechanism (104) of FIG. 2.

FIG. 3 depicts a schematic representation of an example of the screw-moving actuator (102) and of the bias-adjustment mechanism (104) of FIG. 2. By way of example, the screw-moving assembly (100) may be adapted such that the screw-moving actuator (102) includes (and is not limited to): an electric-motor assembly (120), a rack-and-pinion assembly (122), a shaft assembly (124), and a piston assembly (126). The electric-motor assembly (120) is coupled to the rack-and-pinion assembly (122). The rack-and-pinion assembly (122) is coupled to the shaft assembly (124). The shaft assembly (124) is coupled to the piston assembly (126). The piston assembly (126) is configured to be coupled to the screw assembly (903).

By way of another example, the screw-moving assembly (100) may be further adapted such that the bias-adjustment mechanism (104) includes (and is not limited to): a fluid-based actuator (130) having: (i) a piston arrangement (132), and (H) a fluid-reservoir assembly (134) that is configured to accommodate, in use, a fluid. The piston arrangement (132) contacts the fluid-reservoir assembly (134). The piston arrangement (132) is coupled to the screw-moving actuator (102): that is, the piston arrangement (132) is coupled to the shaft assembly (124) of the screw-moving actuator (102). It will be appreciated that the definition of a fluid means a material that may be a liquid (such as oil, water, hydraulic fluid), a gas (such as nitrogen, air), or flowable solid (particles of flowable solid matter).

Figure 4:
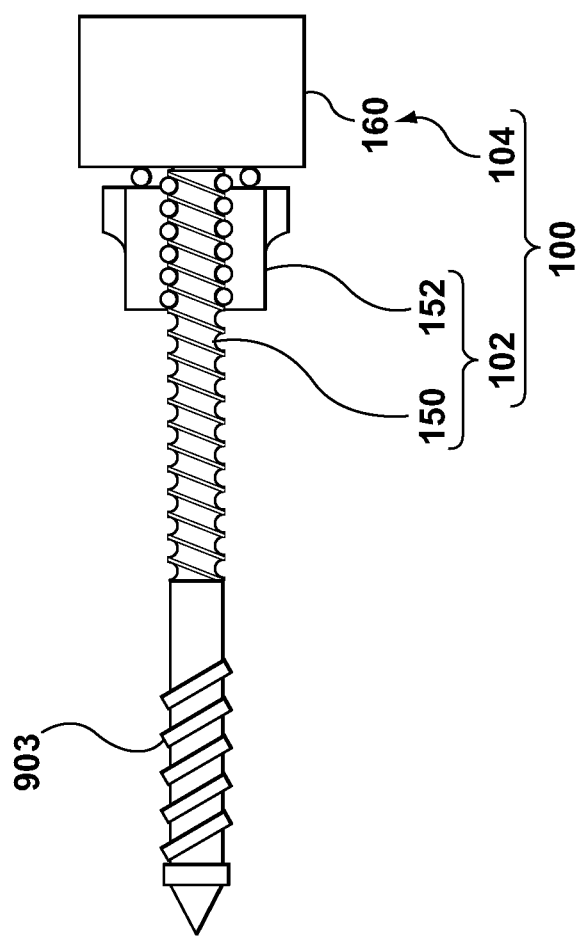
FIG. 4 depicts a schematic representation of an example of the screw-moving actuator (102) and of the bias-adjustment mechanism (104) of FIG. 2.

FIG. 4 depicts a schematic representation of an example of the screw-moving actuator (102) and of the bias-adjustment mechanism (104) of FIG. 2. By way of example, the screw-moving assembly (100) may be further adapted such that the screw-moving actuator (102) includes (and is not limited to): (i) a ball-screw assembly (150), and (ii) an electric-motor assembly (152). The electric-motor assembly (152) is coupled to the ball-screw assembly (150). The ball-screw assembly (150) is configured to be coupled to the screw assembly (903). By way of example, the screw-moving assembly (100) may be further adapted such that the bias-adjustment mechanism (104) includes (and is not limited to): a piston system (160) coupled to the screw-moving actuator (102). Specifically, the piston system (160) is coupled to the ball-screw assembly (150) of the screw-moving actuator (102). The piston system (160) may also be called a hydraulic motor.

Figure 5B:
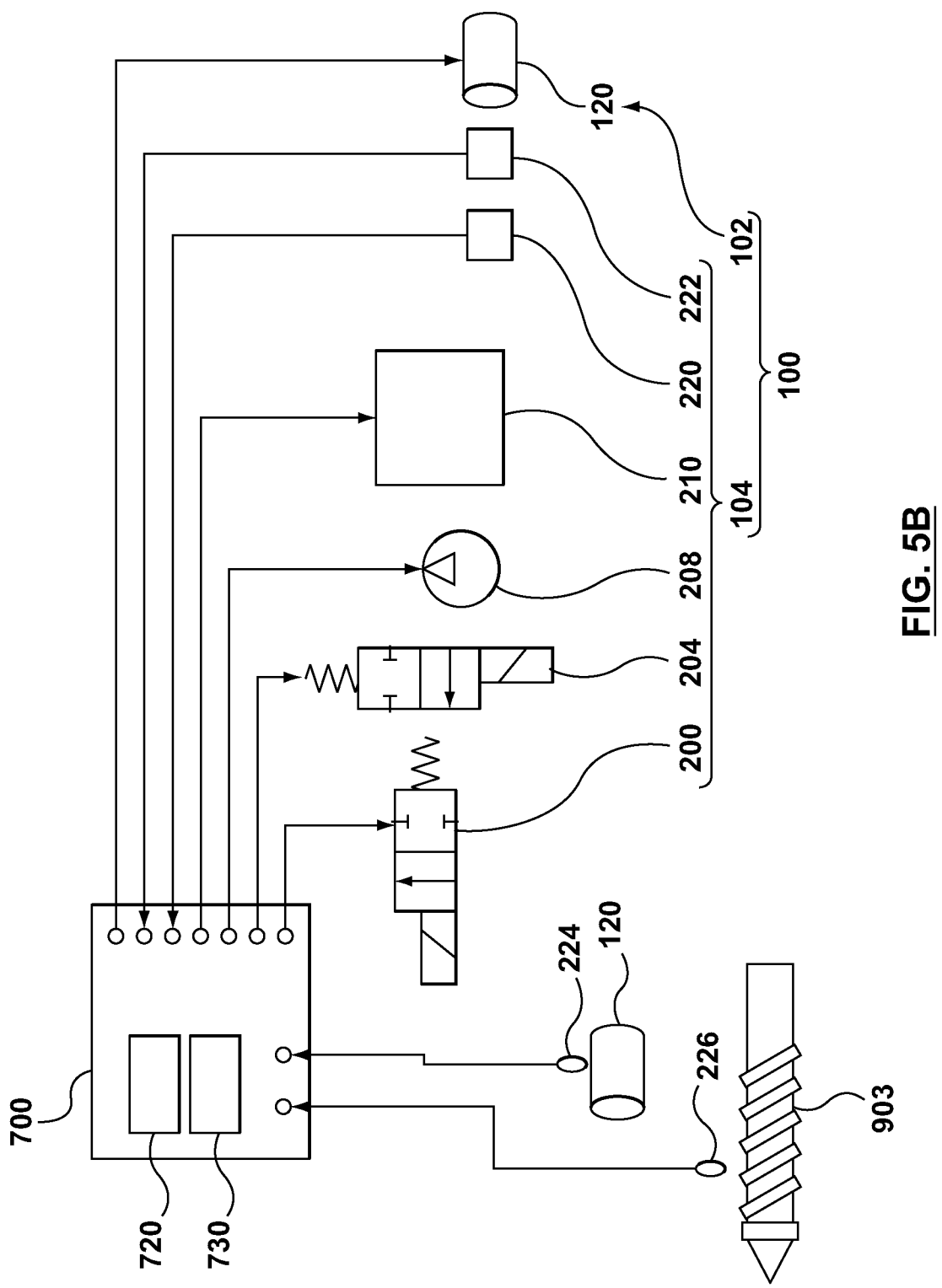

FIGS. 5A and 5B depict schematic representations of a first specific example of the bias-adjustment mechanism (104) of the screw-moving assembly (100) of FIG. 1. The medium used in the bias-adjustment mechanism (104) is gas (compressed gas, air, etc). The bias-adjustment mechanism (104) includes (and is not limited to): a first lock valve assembly (200), a first exhaust assembly (202), a second lock valve assembly (204), an accumulator assembly (206), a gas-supply assembly (208), a pressure-regulator assembly (210), a second exhaust assembly (212), a gas-reservoir assembly (214), a first pressure-transducer assembly (220), a second pressure-transducer assembly (222), and a controller assembly (700). The gas-reservoir assembly (214) is operated at a high pressure than accumulator assembly (206). The fluid-reservoir assembly (134) is configured to accommodate, in use, a fluid. The piston arrangement (132) contacts the fluid-reservoir assembly (134). The piston arrangement (132) is coupled to the screw-moving actuator (102). The first lock valve assembly (200) is in fluid communication with the fluid-reservoir assembly (134). The first exhaust assembly (202) is coupled to the first lock valve assembly (200). The second lock valve assembly (204) is in fluid communication with the fluid-reservoir assembly (134). The accumulator assembly (206) is in fluid communication with the second lock valve assembly (204). The pressure-regulator assembly (210) is in fluid communication with the second lock valve assembly (204) and with the accumulator assembly (206). The gas-supply assembly (208) is in fluid communication with the pressure-regulator assembly (210). The second exhaust assembly (212) is in fluid communication with the pressure-regulator assembly (210). The gas-reservoir assembly (214) is in fluid communication with the pressure-regulator assembly (210). The first pressure-transducer assembly (220) is configured to sense pressure of the accumulator assembly (206). The second pressure-transducer assembly (222) is configured to sense pressure of the gas-reservoir assembly (214). The controller assembly (700) is configured to operate in accordance with the operation sequence as depicted in FIG. 8. The controller assembly (700) is operatively connected to a combination of a motor-sensor assembly (224) and a screw-sensor assembly (226). The motor-sensor assembly (224) is configured to sense current used by the electric-motor assembly (120). The screw-sensor assembly (226) is configured to sense screw speed and screw position. By way of example, the screw-sensor assembly (226) may include a TEMPOSONIC (TRADEMARK) sensor manufactured by MTS Systems Corporation (Sensors Division) based in North Carolina, USA. The controller assembly (700) is configured to read the output from the motor-sensor assembly (224) and the screw-sensor assembly (226).

The first lock valve assembly (200) is a safety device that is used to relive pressure from the fluid-reservoir assembly (134) for the case where the operation of the bias-adjustment mechanism (104) is required to stop operation under emergency situations. The first exhaust assembly (202) is used in pneumatic circuits to exhaust the compressed air to the environment while reducing unwanted noise, etc. The second lock valve assembly (204) is a safety device that is used to cut pressure from the accumulator assembly (206) to the fluid-reservoir assembly (134) for the case where the operation of the bias-adjustment mechanism (104) is required to stop operation under emergency situations. The accumulator assembly (206) is not emptied and thus does not need to be re-charged when running again. This allows a reduction in energy consumption. The accumulator assembly (206) is used to operate the bias-adjustment mechanism (104); initially the gas-supply assembly (208) fills the accumulator assembly (206) and/or (at the same time or sequentially) the gas-reservoir assembly (214) with air to a predetermined amount of initial pressure. After charging of the accumulator assembly (206) is completed for initial conditions, normal operation of the bias-adjustment mechanism (104) relies on the pressure excreted by the accumulator assembly (206). However, the bias-adjustment mechanism (104) may experience, over time, some amount of leakage. To deal with the problem of ongoing leakage, any air that is lost by unwanted (inadvertent) leakage may be backfilled by way of usage of the gas-supply assembly (208) or the gas-reservoir assembly (214). The gas-supply assembly (208) may include any means to generate the required pressure (such as a pump, a booster, pre-charged bottles, etc). The gas-supply assembly (208) is used to fill the gas-reservoir assembly (214) and/or the accumulator assembly (206). Control is executed by the pressure-regulator assembly (210) responsive to information received by the pressure-regulator assembly (210) from the first pressure-transducer assembly (220) and by the second pressure-transducer assembly (222). The second exhaust assembly (212) operates in a similar fashion as the first exhaust assembly (202). The first pressure-transducer assembly (220) reads the pressure in the accumulator assembly (206) and fluid-reservoir assembly (134). This pressure read-out is required for the controller assembly (700) to control the bias-adjustment force; i.e. if pressure has to be released by second exhaust assembly (212) or if pressure has to be added by gas-reservoir assembly (214) or gas-supply assembly (208). The second pressure-transducer assembly (222) reads the pressure in the gas-reservoir assembly (214). This pressure read-out is required for the controller assembly (700) to know if the gas-reservoir assembly (214) must be re-charged.

FIG. 5 B depicts the connections between the controller assembly (700) and the various components of the bias-adjustment mechanism (104) of FIG. 5A. Operation of the controller assembly (700) is described with reference to FIG. 8

FIGS. 6A and 6B depict schematic representations of a second specific example of the bias-adjustment mechanism (104) of the screw-moving assembly (100) of FIG. 1. The medium used in the bias-adjustment mechanism (104) is hydraulic oil. The bias-adjustment mechanism (104) includes (and is not limited to) a combination of: a first lock valve assembly (300), a first reservoir assembly (302), a second lock valve assembly (304), a first accumulator assembly (306), a fluid-supply assembly (308), a pressure-regulator assembly (310), a second reservoir assembly (312), a second accumulator assembly (314), a first pressure-transducer assembly (320), a second pressure-transducer assembly (322), and a controller assembly (700). The first reservoir assembly (302) may be called a tank. The second reservoir assembly (312) may be called a tank. The second accumulator assembly (314) is operated at a higher pressure than the first accumulator assembly (306). The fluid-reservoir assembly (134) is configured to accommodate, in use, a fluid. The piston arrangement (132) contacts the fluid-reservoir assembly (134). The piston arrangement (132) is coupled to the screw-moving actuator (102). The first lock valve assembly (300) is in fluid communication with the fluid-reservoir assembly (134). The first reservoir assembly (302) is coupled to the first lock valve assembly (300). The second lock valve assembly (304) is in fluid communication with the fluid-reservoir assembly (134). The first accumulator assembly (306) is in fluid communication with the second lock valve assembly (304). The pressure-regulator assembly (310) is in fluid communication with the second lock valve assembly (304) and with the first accumulator assembly (306). The fluid-supply assembly (308) is in fluid communication with the pressure-regulator assembly (310). The second reservoir assembly (312) is in fluid communication with the pressure-regulator assembly (310). The second accumulator assembly (314) is in fluid communication with the pressure-regulator assembly (310). The first pressure-transducer assembly (320) is configured to sense pressure of the first accumulator assembly (306). The second pressure-transducer assembly (322) is configured to sense pressure of the second accumulator assembly (314). The controller assembly (700) is operatively connected to: the first lock valve assembly (300), the second lock valve assembly (304), the fluid-supply assembly (308), the pressure-regulator assembly (310), the first pressure-transducer assembly (320), and the second pressure-transducer assembly (322). The controller assembly (700) is configured to operate in accordance with the operation sequence as depicted in (and described in association with) FIG. 8. The controller assembly (700) is operatively connected to a combination of a motor-sensor assembly (224) and a screw-sensor assembly (226). The motor-sensor assembly (224) is configured to sense current used by the electric-motor assembly (120) to read torque value of motor or acting on the screw-moving actuator (102). The screw-sensor assembly (226) is configured to sense screw speed and screw position. By way of example, the screw-sensor assembly (226) may include a TEMPOSONIC (TRADEMARK) sensor.

The piston arrangement (132) is configured to generate the required bias-adjustment force based on the pressure in the fluid-reservoir assembly (134). The first lock valve assembly (300) is a safety device that is used to relive pressure from the fluid-reservoir assembly (134) for the case where the operation of the bias-adjustment mechanism (104) is required to stop operation under emergency situations. The first reservoir assembly (302) is configured to collect the oil that exists from the first reservoir assembly (302). The first reservoir assembly (302) and second reservoir assembly (312) may be a single reservoir assembly. The second lock valve assembly (304) is a safety device that is used to cut pressure from the first accumulator assembly (306) to the fluid-reservoir assembly (134) for the case where the operation of the bias-adjustment mechanism (104) is required to stop operation under emergency situations. The first accumulator assembly (306) is not emptied and thus does not need to be re-charged when running again. This allows a reduction in energy consumption. To operate the bias-adjustment mechanism (104), initially the fluid-supply assembly (308) fills the first accumulator assembly (306) and/or (at the same time or sequentially) the second accumulator assembly (314) with fluid to a predetermined amount of initial pressure. After charging of the first accumulator assembly (306) is completed for initial conditions, the normal operation of the bias-adjustment mechanism (104) relies on the pressure excreted by the first accumulator assembly (306). However, the bias-adjustment mechanism (104) will experience some amount of leakage over time. To deal with the problem of leakage, any fluid that is lost by leakage may be backfilled by way of usage of the gas-supply assembly (208) or the second accumulator assembly (314). It will be appreciated that any means may be used to generate the required pressure and fill the second accumulator assembly (314) and/or the first accumulator assembly (306). Control is executed by the pressure-regulator assembly (310). The second reservoir assembly (312) is configured to collect the oil that exists from the fluid-reservoir assembly (399). The first reservoir assembly (302) and the second reservoir assembly (312) may be one reservoir. The first pressure-transducer assembly (320) reads the pressure in the first accumulator assembly (306) and fluid-reservoir assembly (134). This pressure read-out is required for the controller assembly (700) to control the bias-adjustment force; that is, for the case where the pressure has to be released to the second reservoir assembly (312), or for the case where the pressure has to be added by the gas-reservoir assembly (214) or by the fluid-supply assembly (308). The second pressure-transducer assembly (322) reads the pressure in the second accumulator assembly (314). This pressure read-out is required for the controller assembly (700) to know if the second accumulator assembly (314) must be re-charged.

FIG. 6 B depicts the connections between the controller assembly (700) and the various components of the bias-adjustment mechanism (104) of FIG. 6A. Operation of the controller assembly (700) is described with reference to FIG. 8

FIG. 7 depicts a schematic representation of a variation of the second example of the bias-adjustment mechanism (104) of FIG. 6A, in which the bias-adjustment mechanism (104) further includes (and is not limited to): (i) a third lock-valve assembly (330), and (ii) a fluid-treatment assembly (332) configured to filtering and heat management (cooling and heating) of the fluid. The third lock-valve assembly (330) is in fluid communication with the fluid-reservoir assembly (134). The fluid-treatment assembly (332) is in fluid communication with the third lock-valve assembly (330). The fluid-treatment assembly (332) is in fluid communication with the first accumulator assembly (306).

FIG. 8 depicts various operations to be executed by the controller assembly (700). Generally speaking, the controller assembly (700) is configured to optimize an amount of the biasing force (114), depicted in FIG. 2, to be applied by the bias-adjustment mechanism (104) to the screw assembly (903) during a molding cycle (850) of the molding system (900) of FIG. 1. More specifically, the controller assembly (700) is configured to execute (and is not limited to) the following operations: a reading operation (800), a determination operation (802), a cycling operation (804), a determination operation (806), a reduction operation (808), a determining operation (810), an increasing operation (812), a writing operation (814), and an application operation (816).

An example of how the controller assembly (700) is configured to optimize the amount of the biasing force (114) is to use a set of controller-executable instructions (730), also called computer programs, which are configured to execute the operations of the controller assembly (700). Computer software, or just software, is a collection of computer programs, such as the controller-executable instructions (730) and related data that provide the instructions for instructing a computer (a controller system) what to do and how to do it. In other words, software is a conceptual entity that is a set of computer programs, procedures, and associated documentation concerned with the operation of the controller assembly (700), also called a data-processing system. Software refers to one or more computer programs and data held in a storage assembly (a memory module) of the controller assembly (700) for some purposes. In other words, software is a set of programs, procedures, algorithms and its documentation. Program software performs the function of the program it implements, either by directly providing instructions to computer hardware or by serving as input to another piece of software. In computing, an executable file (executable instructions) causes the controller assembly (700) to perform indicated tasks according tO encoded instructions, as opposed to a data file that must be parsed by a program to be meaningful. These instructions are traditionally machine-code instructions for a physical central processing unit. However, in a more general sense, a file containing instructions (such as bytecode) for a software interpreter may also be considered executable; even a scripting language source file may therefore be considered executable in this sense. While an executable file can be hand-coded in machine language, it is far more usual to develop software as source code in a high-level language understood by humans, or in some cases, an assembly language more complex for humans but more closely associated with machine-code instructions. The high-level language is compiled into either an executable machine-code file or a non-executable machine-code object file; the equivalent process on assembly language source code is called assembly. Several object files are linked to create the executable. The same source code can be compiled to run under different operating systems, usually with minor operating-system-dependent features inserted in the source code to modify compilation according to the target. Conversion of existing source code for a different platform is called porting. Assembly-language source code, and executable programs, are not transportable in this way. An executable comprises machine code for a particular processor or family of processors. Machine-code instructions for different processors are completely different and executables are totally incompatible. Some dependence on the particular hardware, such as a particular graphics card may be coded into the executable. It is usual as far as possible to remove such dependencies from executable programs designed to run on a variety of different hardware, instead installing hardware-dependent device drivers on the computer, which the program interacts with in a standardized way. Some operating systems designate executable files by filename extension or noted alongside the file in its metadata (such as by marking an execute permission in Unix-like operating systems). Most also check that the file has a valid executable file format to safeguard against random bit sequences inadvertently being run as instructions. Modern operating systems retain control over the computer's resources, requiring that individual programs make system calls to access privileged resources. Since each operating system family features its own system call architecture, executable files are generally tied to specific operating systems, or families of operating systems. There are many tools available that make executable files made for one operating system work on another one by implementing a similar or compatible application binary interface. When the binary interface of the hardware the executable was compiled for differs from the binary interface on which the executable Es run, the program that does this translation is called an emulator. Different files that can execute but do not necessarily conform to a specific hardware binary interface, or instruction set, can be either represented in bytecode for Just-in-time compilation, or in source code for use in a scripting language.

An alternative to using the controller-executable instructions (730) is to use an application-specific integrated circuit (ASIC), which is an integrated circuit (IC) customized for a particular use, rather than intended for general-purpose use. For example, a chip designed solely to run a cell phone is an ASIC. Some ASICs include entire 32-bit processors, memory blocks including ROM (read only memory), RAM (random-access memory), EEPROM (erasable programmable read only memory), and other blocks of memory. Such an ASIC is often termed a SoC (system-on-chip). Designers of digital ASICs use a hardware-description language (HDL) to describe the functionality of ASICs. Field-programmable gate arrays (FPGA) are used for building a breadboard or prototype from standard parts; programmable logic blocks and programmable interconnects allow the same FPGA to be used in many different applications. For smaller designs and/or lower production volumes, FPGAs may be more cost effective than an ASIC design. A field-programmable gate array (FPGA) is an integrated circuit designed to be configured by the customer or designer after manufacturing—hence the term field-programmable. The FPGA configuration is generally specified using a hardware-description language (HDL), similar to that used for an application-specific integrated circuit (ASIC) (circuit diagrams were previously used to specify the configuration, as they were for ASICs, but this is increasingly rare). FPGAs can be used to implement any logical function that an ASIC could: perform. The ability to update the functionality after shipping, partial re-configuration of the portion of the design and the low non-recurring engineering costs relative to an ASIC design (notwithstanding the generally higher unit cost) offer advantages for many applications. FPGAs contain programmable logic components called logic blocks, and a hierarchy of reconfigurable interconnects that allow the blocks to be wired together—somewhat like many (changeable) logic gates that can be inter-wired in (many) different configurations. Logic blocks can be configured to perform complex combinational functions, or merely simple logic gates like AND and XOR. In most FPGAs, the logic blocks also include memory elements, which may be simple flip-flops or may be more complete blocks of memory. In addition to digital functions, some FPGAs have analog features. The most common analog feature is programmable slew rate and drive strength on each output pin, allowing the engineer to set slow rates on lightly loaded pins that would otherwise ring unacceptably, and to set stronger, faster rates on heavily loaded pins on high-speed channels that would otherwise run too slow. Another relatively common analog feature is differential comparators on input pins designed to be connected to differential signaling channels. A few mixed signal FPGAs have integrated peripheral Analog-to-Digital Converters (ADCs) and Digital-to-Analog Converters (DACs) with analog signal conditioning blocks allowing them to operate as a system-on-a-chip. Such devices blur the line between an FPGA, which carries digital ones and zeros on its internal programmable interconnect fabric, and field-programmable analog array (FPAA), which carries analog values on its internal programmable interconnect fabric.

Based on the above description, it will be appreciated that the controller assembly (700) may include any one of: the controller-executable instructions (730), an application-specific integrated circuit, and a field-programmable gate arrays.

Referring now to FIG. 8, the reading operation (800) includes (and is not limited to): reading an initial preload. A user may input the initial preload to the controller assembly (700) via a keyboard or other user interface device. The determination operation (802) includes determining an amount of the biasing force (114). The cycling operation (804) includes operating the molding system (900) for "n" (a number of) molding cycles. The determination operation (806) includes (and is not limited to) determining whether a resulting control force, to be applied to the screw assembly (903), is less than zero during a hold phase of a molding cycle (850) of the molding system (900). That is, is Fcontrol (control force) less than zero during the present hold cycle of the molding system (900)? If the determination operation (806) is TRUE or YES, then control is transferred to a reduction operation (808). If the determination operation (806) is FALSE or NO, then control is transferred to a determining operation (810).

The reduction operation (808) includes (and is not limited to) reducing the amount of the biasing force (114), that is, reduce preload force, and then control is transferred to the determination operation (802). The determining operation (810) includes (and is not limited to) determining whether the control force is greater than zero but less than the optimized force during the hold cycle of the molding system (900): that is, is zero less than Fcontrol AND is Fcontrol (control force) less than Fopt (optimal force) during the present hold cycle? If the determining operation (810) is FALSE or NO, then control is transferred to an increasing operation (812). If the determining operation (810) is TRUE or YES, then control is transferred to a writing operation (814).

The increasing operation (812) includes and is not limited to increasing the amount of the biasing force (114), that is, Increase Preload, and then operation is transferred to the determination operation (802). The writing operation (814) includes (and is not limited to) writing the amount of the determined optimized preload to be applied by the bias-adjustment mechanism (104). The application operation (816) includes (and is not limited to) applying the amount of the determined optimized preload to be applied by the bias-adjustment mechanism (104).

The procedure for adjusting the amount of the biasing force (114) of FIG. 2 may include the following steps: (i) charging the molding system (900) to a given pressure, and (ii) allowing the controller assembly (700) to optimize the pressure. The pressure-regulator assembly (210) and the pressure-regulator assembly (310) releases pressure to the second reservoir assembly (312) or the second exhaust assembly (212). The pressure-regulator assembly (210) and the pressure-regulator assembly (310) increases the pressure with: (i) the gas-supply assembly (208) and the fluid-supply assembly (308), or with (ii) the gas-reservoir assembly (214) and the second accumulator assembly (314).

FIG. 9 depicts a profile of various forces associated with the bias-adjustment mechanism (104) of FIG. 2. FIG. 9 depicts an undesired amount of the biasing force (105) that is not used by the bias-adjustment mechanism (104). The injection-force axis (852) is the amount of force to be applied to the screw assembly (903). The time axis (853) indicates elapsed time. An injection-force profile (856) of an injection force is to be applied to the screw assembly (903) of FIG. 2 during the molding cycle (850) of the molding system (900) of FIG. 1. A biasing-force profile (857) of the biasing force (105) is used for the initial condition. The biasing force (105) typically drops during motion as the volume increase and thus the pressure decreases. There is depicted a moving-force profile (858) of the moving force (103) of the screw-moving actuator (102) of FIG. 2.

FIG. 10 depicts a profile of the forces associated with the bias-adjustment mechanism (104) of FIG. 2. FIG. 10 depicts a desired amount of the biasing force (105) that is used by the bias-adjustment mechanism (104). The injection-force profile (856) depicted in FIG. 10 is the same as the injection-force profile (856) depicted in FIG. 9. An optimized biasing-force profile (867) of the biasing force (105) is used for the initial condition. Depicted is a resulting moving-force profile (868) of the moving force (103) of the screw-moving actuator (102) of FIG. 2.

FIG. 11 depicts a schematic representation of an example of the screw-moving assembly (100) having an example of the fluid-supply assembly (308) of the bias-adjustment mechanism (104) depicted in FIG. 6 and FIG. 7. The fluid-supply assembly (308) includes (and is not limited to) a servo-pump assembly (502), a servo-motor assembly (504), a pressure-reducing valve assembly (506) and a check-valve assembly (510). The servo-pump assembly (502) is fluidly connected to the first reservoir assembly (312A), and also to the check-valve assembly (510), and the servo-pump assembly (502) is configured to pump, in use, the fluid to the first accumulator assembly (306). The servo-motor assembly (504) is connected to the servo-pump assembly (502), and the motor assembly is configured to drive, in use, the servo-pump assembly (502). The pressure-reducing valve assembly (506) is fluidly connected to the check-valve assembly (510), and is also fluidly connected to the first reservoir assembly (312A), and the pressure-reducing valve assembly (506) is configured to reduce pressure from an output of the servo-pump assembly (502). The emergency-stop assembly (508) is fluidly connected to the fluid-reservoir assembly (134), and is also fluidly connected to the second reservoir assembly (312B), and the emergency-stop assembly (508) is configured to depressurize the fluid in the fluid-reservoir assembly (134) responsive to receiving a request to stop. The check-valve assembly (510) is fluidly connected to the first accumulator assembly (306). The check-valve assembly (510) is configured to prevent back flow of the fluid from the first accumulator assembly (306) to the servo-pump assembly (502).

Other components may be need to operate the example depicted in FIG. 11, such as a manual dumb valve, a manometer, a main pressure-relief valve, filter assembly, a cooling assembly, etc. It will be appreciated that these other components are known to persons of skill in the art, and therefore are not described here. These components may be required, but they do not participate in the function of the arrangement depicted in FIG. 11.

A node (650) is depicted in FIG. 13, and is described in association with FIG. 13.

The pressure-reducing valve assembly (506) is used to a supply system. The pressure-reducing valve assembly (506) may-be added treated as the dumb valve, a manometer, etc, as something known to persons of skill in the art. The emergency-stop assembly (508) operates in a similar manner to the first lock valve assembly (300). The fluid-reservoir assembly 134 is decompressed in order to not have an unexpected movement of the piston and screw. The combination of the emergency-stop assembly (508) and the first lock valve assembly (300) has the advantage to not fully discharge the first accumulator assembly (306). The emergency-stop assembly (508) does not need to be re-charged from 0 bar (pressure) at start-up. There is a small energy savings realized with the emergency-stop assembly (508). The check-valve assembly (510) is used to secure the pump from the accumulator. The pressure-transducer assembly (702) operates the same as the first pressure-transducer assembly 320 in FIG. 6A. The pressure-regulator assembly (310) allows a release of pressure from first accumulator assembly (306) to first reservoir assembly (312A) in order to adjust biasing-force.

FIG. 12 depicts a schematic representation of another example of the fluid-supply assembly (308) of the bias-adjustment mechanism (104) depicted in FIG. 6 and FIG. 7. FIG. 12 depicts a schematic representation of an example of the screw-moving assembly (100) having another example of the fluid-supply assembly (308) of the bias-adjustment mechanism (104) depicted in FIG. 6 and FIG. 7. The fluid-supply assembly (308) includes (and is not limited to) a pump assembly (602) and an electric-motor assembly (604) and a first pressure-relief valve assembly (608). The bias-adjustment mechanism (104) may further include (and is not limited to): a second accumulator assembly (314), a first pressure-relief valve assembly (608), a first check-valve assembly (610), a pressure-transducer assembly (612), an emergency-stop assembly (614), a pressure-regulating valve assembly (616), a second pressure-transducer assembly (618), and a second check-valve assembly (620). The pump assembly (602) is fluidly connected to the first reservoir assembly (312A), and is also fluidly connected to the first check-valve assembly (610). The first reservoir assembly (312A) may also be called a tank. The electric-motor assembly (604) is operatively connected to the pump assembly (602), and the electric-motor assembly (604) is configured to drive, in use, the pump assembly (602). The accumulator assembly (606) is fluidly connected to the first check-valve assembly (610), and the accumulator assembly (606) is configured to accumulate the fluid received from the pump assembly (602) by way of the first check-valve assembly (610). The first pressure-relief valve assembly (608) is fluidly-connected to the first check-valve assembly (610), and the first pressure-relief valve assembly (608) is configured to provide pressure relief to the fluid for the case where the fluid pressure exceeds an upper threshold limit. The first pressure-relief valve assembly (608) is fluidly connected to the first check-valve assembly (610), and the first pressure-relief valve assembly (608) is configured to provide relief of fluid pressure at the first pressure-relief valve assembly (608). The first check-valve assembly (610) is fluidly connected to the pump assembly (602). The first check-valve assembly (610) is configured to prevent the back flow of the fluid to the pump assembly (602). The pressure-transducer assembly (612) is fluidly connected to the first check-valve assembly (610), and the pressure-transducer assembly (612) is configured to detect the fluid pressure at the output of the first check-valve assembly (610). The emergency-stop assembly (614) is fluidly connected to the fluid-reservoir assembly (134), and the emergency-stop assembly (614) is configured to decompress the fluid-reservoir assembly (134) and direct the fluid to the second reservoir assembly (312B) in response to receiving a command to bypass the fluid to second reservoir assembly (312B). The pressure-regulating valve assembly (616) is fluidly connected to the first check-valve assembly (610), and is fluidly connected to the second check-valve assembly (620), and the pressure-regulating valve assembly (616) is configured to regulate, in use, the fluid pressure generated by the pump assembly (602) The second pressure-transducer assembly (618) is connected to the output of the second check-valve assembly (620), and the second pressure-transducer assembly (618) is configured to provide an indication of the fluid pressure that is present at of the second check-valve assembly (620). The second check-valve assembly (620) is fluidly connected to the first accumulator assembly (306), and the second check-valve assembly (620) is configured to prevent back from of the fluid from the first accumulator assembly (306) to the pump assembly (602).

Other components may be needed to operate the example depicted in FIG. 11, such as a manual dumb valve, a manometer, a main pressure-relief valve, filter assembly, a cooling assembly, a lock valve for accumulator, etc. It will be appreciated that these other components are known to persons of skill in the art, and therefore are not described here. These components may be required, but they do not participate in the function of the arrangement depicted in FIG. 12.

A node (650) is depicted in the example of FIG. 12, and is described in association with the example of FIG. 13. The first pressure-relief valve assembly (608) is configured to protect the supply system. The second accumulator assembly (314) is configured to compensate for leakage in the system. In FIG. 11, the leakage is compensated by starting the motor and pump. In FIG. 12, the electric-motor assembly (604) and the pump assembly (602) do not need to start on a regular basis. The motor and the pump are only started if second accumulator assembly (314) is discharged due to leakage compensation. This allows usage of a more economical motor and pump.

The first accumulator assembly (306) is the working accumulator during cycling. The first check-valve assembly (610) is configured to protect the pump assembly (602) from the second accumulator assembly (314). The pressure-transducer assembly (612) is configured to operate similar to the second pressure-transducer assembly (322) depicted in FIG. 6A The emergency-stop assembly (614) is configured to operate similar to the first lock valve assembly (300). The pressure-regulating valve assembly (616) is configured to operate similar to the pressure regulating (310). In comparison to FIG. 11, the pressure-regulating valve assembly (616) allows to connect the fluid-supply assembly (308) to the first accumulator assembly (306): that is, to fill to given pressure by controller assembly (700), and to release pressure from first accumulator assembly (306) to first reservoir assembly (312A). The second pressure-transducer assembly (618) is configured to operate similar to the first pressure-transducer assembly (320) depicted in FIG. 6A. Regarding the second check-valve assembly (620), during actuation of the injection piston, the pressure in first accumulator assembly (306) and fluid-reservoir assembly (134) fluctuates (that is the volume increases or decreases). This fluctuation may cause the pressure-regulating valve assembly (616) to open to the supply or to the tank during cycle. The second check-valve assembly (620) is used to avoid the above situation as the second check-valve assembly (620) is configured to prevent the fluctuation from affecting the pressure-regulating valve assembly (616).

FIG. 13 depicts a schematic representation of an example of the bias-adjustment mechanism (104) further including, in accordance with an option, a fluid-management assembly (652). Specifically, the fluid-management assembly (652) may be used with the bias-adjustment mechanism (104) as depicted in FIG. 11 and FIG. 12. The fluid-management assembly (652) is configured to manage the fluid used by the bias-adjustment mechanism (104). By way of example: the fluid-management assembly (652) includes (and is not limited to): a first check-valve assembly (654A), a second check-valve assembly (654B), a flow-divider assembly (656), a first flow-restriction assembly (658A), a second flow-restriction assembly (658B), a fluid-filter assembly (660), a fluid-cooling assembly (662), a fluid-heating assembly (664). The first check-valve assembly (654A) is fluidly coupled to the fluid-reservoir assembly (134) and is also fluidly coupled to the flow-divider assembly (656), and first check-valve assembly (654A) is configured to transmit the fluid from the fluid-reservoir assembly (134) to the flow-divider assembly (656). The second check-valve assembly (654B) is fluidly coupled to the fluid-reservoir assembly (134), and the second check-valve assembly (654B) is configured to transmit the fluid from the first accumulator assembly (306) to the fluid-reservoir assembly (134). The flow-divider assembly (656) is configured to split the flow of fluid into a first branch (666A) and a second branch (666B), the second branch (666B) is coupled to the first accumulator assembly (306), the first branch (666A) is coupled to the fluid-filter assembly (660). The fluid-filter assembly (660) is configured to filter particulates from the fluid passing through the fluid-filter assembly (660). The first flow-restriction assembly (658A) is coupled in-line with the first branch (666A), and the first flow-restriction assembly (658A) is configured to restrict flow of the fluid through the first branch (666A). The second flow-restriction assembly (658B) is coupled in-line with the second branch (666B), and the second flow-restriction assembly (658B) is configured to restrict flow of the fluid through the second branch (666B). The fluid-cooling assembly (662) is fluidly coupled in-line with the first branch (666A), and the fluid-cooling assembly (662) is configured to cool, in use, the fluid passing through the fluid-cooling assembly (662) for the case where the fluid passing through the fluid-cooling assembly (662) is determined to require cooling. The fluid-heating assembly (664) is fluidly coupled in-line with the first branch (666A), and the fluid-heating assembly (664) is configured to heat, in use, the fluid passing through the fluid-heating assembly (664) for the case where the fluid passing through the fluid-heating assembly (664) is determined to require heating. The first branch (666A) is fluidly connected to the first accumulator assembly (306). The node (650) may be connected as indicated in FIGS. 11 and 12, or other convenient locations as may be determined.

The first check-valve assembly (654A) is configured to operate similar to the third lock-valve assembly (330) in FIG. 7. The second check-valve assembly (654B) is configured to operate similar to the second lock valve assembly (304) in FIG. 7. The flow-divider assembly (656) is configured to limit the flow going through the filter, cooler and/or heater. These components might only see limited flow and/or pressure drop. The flow-divider assembly (656) is configured to limit the flow by bypassing some of the fluid. The first flow-restriction assembly (658A) and the second flow-restriction assembly (658B) may include orifices of a given size depending of the flow split that is required. The fluid-filter assembly (660) is configured to filter the fluid passing through the fluid-filter assembly (660). The fluid-cooling assembly (662) is configured to cool the fluid passing through the fluid-cooling assembly (662).

The fluid-heating assembly (664) is configured to heat the fluid passing through the fluid-heating assembly (664). The node (650) may be connected as indicated in FIGS. 11 and 12, or other convenient locations as may be determined.

It will be appreciated that the assemblies and modules described above may be connected with each other as may be required to perform desired functions and tasks that are within the scope of persons of skill in the art to make such combinations and permutations without having to describe each one of them in explicit terms. There is no particular assembly, components, or software code that is superior to any of the equivalents available to the art. There is no particular mode of practicing the inventions and/or examples of the invention that is superior to others, so long as the functions may be performed. It is believed that all the crucial aspects of the invention have been provided in this document It is understood that the scope of the present invention is limited to the scope provided by the independent claim(s); and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. A screw-moving assembly (100) for a screw assembly (903), the screw-moving assembly (100) comprising:
   a screw-moving actuator (102) including:
   an electric-motor assembly (120);
   a rack-and-pinion assembly (122);
   a shaft assembly (124); and
   a piston assembly (126);

the electric-motor assembly (120) being coupled to the rack-and-pinion assembly (122); the rack-and-pinion assembly (122) being coupled to the shaft assembly (124); the shaft assembly (124) being coupled to the piston assembly (126); and the piston assembly (126) configured to be coupled to the screw assembly (903); and a bias-adjustment mechanism (104) including a fluid-based actuator (130) having:
- a single piston arrangement (132); and
- a fluid-reservoir assembly (134) configured to accommodate, in use, a fluid selected from the group consisting of a liquid and a flowable solid; wherein the piston arrangement (132) contacts the fluid-reservoir assembly (134) and the piston arrangement (132) is coupled to the screw-moving actuator (102); wherein the screw-moving actuator (102) and the bias-adjustment mechanism (104) are configured to connect to the screw assembly (903); the screw-moving actuator (102) is configured to transmit, in use, a screw-translation force (112) to a longitudinal central axis (905) of the screw assembly (903); and the bias-adjustment mechanism (104) is configured to transmit, in use, a biasing force (114) to the longitudinal central axis (905) of the screw assembly (903); and
- a controller assembly configured to optimize an amount of the biasing force used for an initial condition, the biasing force to be applied by the bias-adjustment mechanism via an accumulator assembly to the screw assembly during a molding cycle as a preload force;

the bias-adjustment mechanism (104) further includes:
- a first lock valve assembly (300);
- a first reservoir assembly (302);
- a second lock valve assembly (304);
- a first accumulator assembly (306);
- a fluid-supply assembly (308);
- a pressure-regulator assembly (310);
- a second reservoir assembly (312);
- a second accumulator assembly (314);
- a first pressure-transducer assembly (320);
- a second pressure-transducer assembly (322);

the first lock valve assembly (300) is in fluid communication with the fluid-reservoir assembly (134); the first reservoir assembly (302) is coupled to the first lock valve assembly (300); the second lock valve assembly (304) is in fluid communication with the fluid-reservoir assembly (134); the first accumulator assembly (306) is in fluid communication with the second lock valve assembly (304); the pressure-regulator assembly (310) is in fluid communication with the second lock valve assembly (304) and with the first accumulator assembly (306); the fluid-supply assembly (308) is in fluid communication with the pressure regulator assembly (310); the second reservoir assembly (312) is in fluid communication with the pressure-regulator assembly (310); the second accumulator assembly (314) is in fluid communication with the pressure-regulator assembly (310); the first pressure-transducer assembly (320) is configured to sense pressure of the first accumulator assembly (306); and the second pressure-transducer assembly (322) is configured to sense the pressure of the second accumulator assembly (314).

2. The screw-moving assembly (100) of claim 1, wherein the piston arrangement (132) is disposed in-line with the longitudinal central axis (905).

3. The screw-moving assembly (100) of claim 1, wherein:
the bias-adjustment mechanism (104) further includes:
- a third lock-valve assembly (330); and
- a fluid-treatment assembly (332) configured for filtering and heat management of the fluid; the third lock-valve assembly (330) is in fluid communication with a fluid-reservoir assembly (134); the fluid-treatment assembly (332) is in fluid communication with the third lock-valve assembly (330); and the fluid-treatment assembly (332) is in fluid communication with a first accumulator assembly (306).

4. The screw-moving assembly (100) of claim 1, wherein:
the bias-adjustment mechanism (104) includes a fluid-supply assembly (308); and
the fluid-supply assembly (308) includes:
- a servo-pump assembly (502);
- a servo-motor assembly (504);
- a pressure-reducing valve assembly (506);
- an emergency-stop assembly (508); and
- a check-valve assembly (510);

the servo-pump assembly (502) is fluidly connected to a second reservoir assembly (312), and also to the check-valve assembly (510), and the servo-pump assembly (502) is configured to pump, in use, the fluid to a first accumulator assembly (306); the servo-motor assembly (504) is connected to the servo-pump assembly (502), and the servo-motor assembly (504) is configured to drive, in use, the servo-pump assembly (502); the pressure-reducing valve assembly (506) is fluidly connected to the check-valve assembly (510), and is also fluidly connected to the second reservoir assembly (312), and the pressure-reducing valve assembly (506) is configured to reduce pressure from an output of the servo-pump assembly (502); and the emergency-stop assembly (508) is fluidly connected to the first accumulator assembly (306), and is also fluidly connected to the second reservoir assembly (312), and the emergency-stop assembly (508) is configured to stop a flow of the fluid to the second reservoir assembly (312) responsive to receiving a request to stop; and the check-valve assembly (510) is fluidly connected to the first accumulator assembly (306), the check-valve assembly (510) is configured to prevent back flow of the fluid from the first accumulator assembly (306) to the servo-pump assembly (502).

5. The screw-moving assembly (100) of claim 1, wherein:
the bias-adjustment mechanism (104) includes a fluid-supply assembly (308); and
the fluid-supply assembly (308) includes:
- a pump assembly (602);
- an electric-motor assembly (604); and
- a first pressure-relief valve assembly (608); and the bias-adjustment mechanism (104) further includes:
- an accumulator assembly (606);
- a first check-valve assembly (610);
- a pressure-transducer assembly (612);
- an emergency-stop assembly (614);
- a pressure-regulating valve assembly (616);
- a second pressure-transducer assembly (618); and
- a second check-valve assembly (620);

the pump assembly (602) is fluidly connected to a second reservoir assembly (312), and is also fluidly connected to the first check-valve assembly (610); the electric-motor assembly (604) is operatively connected to the pump assembly (602), and the electric-motor assembly (604) is configured to drive, in use, the pump assembly (602); the accumulator assembly (606) is fluidly connected to the first check-valve assembly (610), and the accumulator assembly (606) is configured to accumulate the fluid received from the pump assembly (602) by way of the first check-valve assembly (610); the first pressure-relief valve assembly (608) is fluidly connected to the first check-valve assembly (610), and the first pressure-relief valve assembly (608) is configured to provide pressure relief to the fluid for a case where a fluid pressure exceeds an upper threshold limit; the first pressure-relief valve assembly (608) is fluidly connected to the first check-valve assembly (610), and the first pressure-relief valve assembly (608) is configured to provide relief of fluid pressure at the first pressure-relief valve assembly (608); the first check-valve assembly (610) is fluidly connected to the pump assembly (602), the first check-valve assembly (610) is configured to prevent back flow of the fluid to the pump assembly (602); the pressure-transducer assembly (612) is fluidly connected to the first check-valve assembly (610), and the pressure-transducer assembly (612) is configured to detect the fluid pressure at an output of the first check-valve assembly (610); the emergency-stop assembly (614) is fluidly connected to a first accumulator assembly (306), and the emergency-stop assembly (614) is configured to permit the fluid flowing from the pump assembly (602) to by pass the first accumulator assembly (306) and direct the fluid to the second reservoir assembly (312) in response to receiving a command to bypass the fluid to the second reservoir assembly (312); the pressure-regulating valve assembly (616) is fluidly connected to the first check-valve assembly (610), and is fluidly connected to the second check-valve assembly (620), and the pressure-regulating valve assembly (616) is configured to regulate, in use, the fluid pressure generated by the pump assembly (602); the second pressure-transducer assembly (618) is connected to the output of the second check-valve assembly (620), and the second pressure-transducer assembly (618) is configured to provide an indication of the fluid pressure that is present at of the second check-valve assembly (620); and the second check-valve assembly (620) is fluidly connected to the first accumulator assembly (306), and the second check-valve assembly (620) is configured to prevent back flow of the fluid from the first accumulator assembly (306) to the pump assembly (602).

6. The screw-moving assembly (100) of claim 1, wherein:
the bias-adjustment mechanism (104) further includes:
 a fluid-management assembly (652) being configured to manage the fluid used by the bias-adjustment mechanism (104); and
the fluid-management assembly (652) includes:
 a first check-valve assembly (654A);
 a second check-valve assembly (654B);
 a flow-divider assembly (656);
 a first flow-restriction assembly (658A);
 a second flow-restriction assembly (658B);
 a fluid-filter assembly (660);
 a fluid-cooling assembly (662); and
 a fluid-heating assembly (664);
the first check-valve assembly (654A) is fluidly coupled to a fluid-reservoir assembly (134) and is also fluidly coupled to the flow-divider assembly (656), and the first check-valve assembly (654A) is configured to transmit the fluid from the fluid-reservoir assembly (134) to the flow-divider assembly (656); the second check-valve assembly (654B) is fluidly coupled to the fluid-reservoir assembly (134), and the second check-valve assembly (654B) is configured to transmit the fluid from a first accumulator assembly (306) to the fluid-reservoir assembly (134); the flow-divider assembly (656) is configured to split a flow of fluid into a first branch (666A) and a second branch (666B), the second branch (666B) is coupled to the first accumulator assembly (306), the first branch (666B) is coupled to the fluid-filter assembly (660); the fluid-filter assembly (660) is configured to filter particulates from the fluid passing through the fluid-filter assembly (660); the first flow-restriction assembly (658A) is coupled in-line with the first branch (666A), and the first flow-restriction assembly (658A) is configured to restrict a flow of the fluid through the first branch (666A); the second flow-restriction assembly (658B) is coupled in-line with the second branch (666B), and the second flow-restriction assembly (658B) is configured to restrict the flow of the fluid through the second branch (666B); the fluid-cooling assembly (662) is fluidly coupled in-line with the first branch (666A), and the fluid-cooling assembly (662) is configured to cool, in use, the fluid passing through the fluid-cooling assembly (662) for a case where the fluid passing through the fluid-cooling assembly (662) is determined to require cooling; the fluid-heating assembly (664) is fluidly coupled in-line with the first branch (666A), and the fluid-heating assembly (664) is configured to heat, in use, the fluid passing through the fluid-heating assembly (664) for the case where the fluid passing through the fluid-heating assembly (664) is determined to require heating; and the first branch (666A) is fluidly connected to the first accumulator assembly (306).

7. An extruder assembly (902) including the screw-moving assembly (100) of claim 1 and the screw assembly (903), the screw assembly (903) being connected to the screw-moving assembly (100).

8. A molding system (900) including the extruder assembly (902) of claim 7.

9. The screw-moving assembly (100) of claim 2, further comprising:
 a controller assembly (700) configured to optimize an amount of the biasing force (114), the biasing force (114) to be applied by the bias-adjustment mechanism (104) to the screw assembly (903) during a molding cycle (850).

10. The screw-moving assembly (100) of claim 1, further comprising:
 a controller assembly (700) configured to optimize an amount of the biasing force (114), the biasing force (114) to be applied by the bias-adjustment mechanism (104) to the screw assembly (903) during a molding cycle (850).

11. The screw-moving assembly (100) of claim 2, wherein:
the bias-adjustment mechanism (104) includes a fluid-supply assembly (308); and
the fluid-supply assembly (308) includes:
 a servo-pump assembly (502);
 a servo-motor assembly (504);
 a pressure-reducing valve assembly (506);
 an emergency-stop assembly (508); and
 a check-valve assembly (510);
the servo-pump assembly (502) is fluidly connected to a second reservoir assembly (312), and also to the check-valve assembly (510), and the servo-pump assembly (502) is configured to pump, in use, the fluid to a first accumulator assembly (306); the servo-motor assembly (504) is connected to the servo-pump assembly (502), and the servo-motor assembly (504) is configured to drive, in use, the servo-pump assembly (502); the pressure-reducing valve assembly (506) is fluidly connected to the check-valve assembly (510), and is also fluidly connected to the second reservoir assembly (312), and the pressure-reducing valve assembly (506) is configured to reduce pressure from an output of the servo-pump assembly (502); and the emergency-stop assembly (508) is fluidly connected to the first accumulator assembly (306), and is also fluidly connected to the second reservoir assembly (312), and the emergency-stop assembly (508) is configured to stop a flow of the fluid to the second reservoir assembly (312) responsive to receiving a request to stop; and the check-valve assembly (510) is fluidly connected to the first accumulator assembly (306), the check-valve assembly (510) is configured to prevent back flow of the fluid from the first accumulator assembly (306) to the servo-pump assembly (502).

12. The screw-moving assembly (100) of claim 2, wherein:
the bias-adjustment mechanism (104) further includes:
  a fluid-management assembly (652) being configured to manage the fluid used by the bias-adjustment mechanism (104); and
the fluid-management assembly (652) includes:
  a first check-valve assembly (654A);
  a second check-valve assembly (654B);
  a flow-divider assembly (656);
  a first flow-restriction assembly (658A);
  a second flow-restriction assembly (658B);
  a fluid-filter assembly (660);
  a fluid-cooling assembly (662); and
  a fluid-heating assembly (664);
the first check-valve assembly (654A) is fluidly coupled to a fluid-reservoir assembly (134) and is also fluidly coupled to the flow-divider assembly (656), and the first check-valve assembly (654A) is configured to transmit the fluid from the fluid-reservoir assembly (134) to the flow-divider assembly (656); the second check-valve assembly (654B) is fluidly coupled to the fluid-reservoir assembly (134), and the second check-valve assembly (654B) is configured to transmit the fluid from a first accumulator assembly (306) to the fluid-reservoir assembly (134); the flow-divider assembly (656) is configured to split a flow of fluid into a first branch (666A) and a second branch (666B), the second branch (666B) is coupled to the first accumulator assembly (306), the first branch (666B) is coupled to the fluid-filter assembly (660); the fluid-filter assembly (660) is configured to filter particulates from the fluid passing through the fluid-filter assembly (660); the first flow-restriction assembly (658A) is coupled in-line with the first branch (666A), and the first flow-restriction assembly (658A) is configured to restrict a flow of the fluid through the first branch (666A); the second flow-restriction assembly (658B) is coupled in-line with the second branch (666B), and the second flow-restriction assembly (658B) is configured to restrict the flow of the fluid through the second branch (666B); the fluid-cooling assembly (662) is fluidly coupled in-line with the first branch (666A), and the fluid-cooling assembly (662) is configured to cool, in use, the fluid passing through the fluid-cooling assembly (662) for a case where the fluid passing through the fluid-cooling assembly (662) is determined to require cooling; the fluid-heating assembly (664) is fluidly coupled in-line with the first branch (666A), and the fluid-heating assembly (664) is configured to heat, in use, the fluid passing through the fluid-heating assembly (664) for the case where the fluid passing through the fluid-heating assembly (664) is determined to require heating; and the first branch (666A) is fluidly connected to the first accumulator assembly (306).

\* \* \* \* \*